US010217283B2

United States Patent
Dillard et al.

(10) Patent No.: US 10,217,283 B2
(45) Date of Patent: Feb. 26, 2019

(54) NAVIGATION THROUGH MULTIDIMENSIONAL IMAGES SPACES

(71) Applicant: Google Inc., Mountain View, CA (US)

(72) Inventors: Scott Edward Dillard, Shoreline, WA (US); Humberto Castaneda, Kirkland, WA (US); Su Chuin Leong, South San Francisco, CA (US); Michael Cameron Jones, Seattle, WA (US); Christopher Gray, Los Gatos, CA (US); Evan Hardesty Parker, Los Altos, CA (US)

(73) Assignee: Google LLC, Mountain View, CA (US)

( * ) Notice: Subject to any disclaimer, the term of this patent is extended or adjusted under 35 U.S.C. 154(b) by 271 days.

(21) Appl. No.: 14/972,843

(22) Filed: Dec. 17, 2015

(65) Prior Publication Data

US 2017/0178404 A1  Jun. 22, 2017

(51) Int. Cl.
*G06F 3/0488* (2013.01)
*G06T 19/00* (2011.01)
(Continued)

(52) U.S. Cl.
CPC .......... *G06T 19/003* (2013.01); *G06F 3/0488* (2013.01); *G06F 3/04815* (2013.01);
(Continued)

(58) Field of Classification Search
CPC .. G06F 3/0488; G06F 3/04815; G06T 19/003
See application file for complete search history.

(56) References Cited

U.S. PATENT DOCUMENTS

| 5,247,356 A | 9/1993 | Ciampa |
| 5,325,472 A * | 6/1994 | Horiuchi ................ G06T 15/20 345/419 |

(Continued)

FOREIGN PATENT DOCUMENTS

| CA | 2843772 A1 | 2/2013 |
| CN | 1367469 A | 9/2002 |

(Continued)

OTHER PUBLICATIONS

Brian E. Brewington, Observation of Changing Information Sources, Jun. 2000, 156 pages, retrieved from the internet: <http://agent.cs.dartmouth.edu/papers/brewington:thesis.pdf>.

(Continued)

*Primary Examiner* — Phenuel S Salomon
(74) *Attorney, Agent, or Firm* — Lerner, David, Littenberg, Krumholz & Mentlik, LLP

(57) ABSTRACT

Aspects of the disclosure relate generally to providing a user with an image navigation experience. For instance, a first image of a multidimensional space is provided with an overlay line indicating a direction in which the space extends into the first image such that a second image is connected to the first image along a direction of the overlay line. User input indicating a swipe across a portion of the display is received. When swipe occurred at least partially within an interaction zone defining an area around the overlay line at which the user can interact with the space, the swipe indicates a request to display an image different from the first image. The second image is selected and provided for display based on the swipe and a connection graph connecting the first image and the second image along the direction of the overlay line.

20 Claims, 15 Drawing Sheets

(51) Int. Cl.
  *G06F 3/0481* (2013.01)
  *H04N 7/18* (2006.01)
  *G06T 3/40* (2006.01)

(52) U.S. Cl.
  CPC ...... *G06F 3/04883* (2013.01); *G06F 3/04886* (2013.01); *G06T 3/4038* (2013.01); *H04N 7/183* (2013.01)

(56) References Cited

U.S. PATENT DOCUMENTS

| | | | |
|---|---|---|---|
| 5,396,583 | A | 3/1995 | Chen et al. |
| 5,528,263 | A * | 6/1996 | Platzker ............ G06F 3/011 345/156 |
| 5,559,707 | A | 9/1996 | DeLorme et al. |
| 6,097,393 | A | 8/2000 | Prouty, IV et al. |
| 6,285,317 | B1 | 9/2001 | Ong |
| 6,292,215 | B1 | 9/2001 | Vincent |
| 6,314,370 | B1 | 11/2001 | Curtright |
| 6,346,938 | B1 | 2/2002 | Chan et al. |
| 6,477,268 | B1 | 11/2002 | Chiang et al. |
| 6,486,877 | B1 | 11/2002 | Watanabe |
| 6,515,664 | B1 | 2/2003 | Hii |
| 6,563,529 | B1 | 5/2003 | Jongerius |
| 6,609,128 | B1 | 8/2003 | Underwood |
| 6,611,615 | B1 | 8/2003 | Christensen |
| 6,687,753 | B2 | 2/2004 | Schneider |
| 6,717,608 | B1 | 4/2004 | Mancuso et al. |
| 6,771,304 | B1 | 8/2004 | Mancuso et al. |
| 6,774,914 | B1 | 8/2004 | Benayoun |
| 6,885,392 | B1 | 4/2005 | Mancuso et al. |
| 6,895,126 | B2 | 5/2005 | Di Bernardo et al. |
| 7,006,707 | B2 | 2/2006 | Peterson |
| 7,050,102 | B1 | 5/2006 | Vincent |
| 7,096,428 | B2 | 8/2006 | Foote et al. |
| 7,158,878 | B2 | 1/2007 | Rasmussen et al. |
| 7,197,170 | B2 | 3/2007 | Dwyer et al. |
| 7,239,760 | B2 | 7/2007 | Di Bernardo et al. |
| 7,348,963 | B2 * | 3/2008 | Bell ............ A63F 13/02 345/156 |
| 7,369,136 | B1 * | 5/2008 | Heckbert ............ G06T 15/04 345/582 |
| 7,424,133 | B2 | 9/2008 | Schultz et al. |
| 7,460,953 | B2 | 12/2008 | Herbst et al. |
| 7,466,244 | B2 | 12/2008 | Kimchi et al. |
| 7,526,718 | B2 | 4/2009 | Samadani et al. |
| 7,574,381 | B1 | 8/2009 | Lin-Hendel |
| 7,577,316 | B2 | 8/2009 | Di Bernardo et al. |
| 7,643,673 | B2 | 1/2010 | Rohlf et al. |
| 7,734,116 | B2 | 6/2010 | Panabaker et al. |
| 7,777,648 | B2 | 8/2010 | Smith et al. |
| 7,778,491 | B2 | 8/2010 | Steedly et al. |
| 7,787,659 | B2 | 8/2010 | Schultz et al. |
| 7,805,025 | B2 | 9/2010 | DiBernardo et al. |
| 7,813,596 | B2 | 10/2010 | Di Bernardo et al. |
| 7,889,948 | B2 | 2/2011 | Steedly et al. |
| 7,920,072 | B2 | 4/2011 | Smith et al. |
| 7,990,394 | B2 | 8/2011 | Vincent et al. |
| 8,041,730 | B1 | 10/2011 | Upstill et al. |
| 8,159,524 | B2 | 4/2012 | Wilson et al. |
| 8,160,400 | B2 | 4/2012 | Snavely et al. |
| 8,243,997 | B2 | 8/2012 | Davis et al. |
| 8,250,481 | B2 | 8/2012 | Klaric et al. |
| 8,279,218 | B1 * | 10/2012 | Fan ............ G06T 15/04 345/419 |
| 8,326,866 | B1 | 12/2012 | Upstill et al. |
| 8,350,850 | B2 | 1/2013 | Steedly et al. |
| 8,463,487 | B2 | 6/2013 | Nielsen et al. |
| 8,473,148 | B2 | 6/2013 | Nielsen et al. |
| 8,514,266 | B2 | 8/2013 | Wilson et al. |
| 8,527,538 | B1 | 9/2013 | Upstill et al. |
| 8,542,884 | B1 | 9/2013 | Maltby, II |
| 8,577,177 | B2 | 11/2013 | Guetter et al. |
| 8,593,518 | B2 | 11/2013 | Schultz et al. |
| 8,612,465 | B1 | 12/2013 | Brewington |
| RE44,925 | E | 6/2014 | Vincent |
| 8,817,067 | B1 * | 8/2014 | Fan ............ H04N 5/23238 348/36 |
| 8,941,685 | B1 * | 1/2015 | Chapin ............ G06Q 30/0241 345/629 |
| 9,046,996 | B2 | 6/2015 | Gallup et al. |
| 2001/0033283 | A1 | 10/2001 | Liang et al. |
| 2001/0038718 | A1 | 11/2001 | Kumar et al. |
| 2002/0010734 | A1 | 1/2002 | Ebersole et al. |
| 2002/0063725 | A1 | 5/2002 | Tarbutton et al. |
| 2003/0014224 | A1 | 1/2003 | Guo et al. |
| 2003/0080978 | A1 | 5/2003 | Navab et al. |
| 2003/0103169 | A1 | 6/2003 | Okada et al. |
| 2003/0110185 | A1 | 6/2003 | Rhoads |
| 2003/0142115 | A1 | 7/2003 | Endo et al. |
| 2003/0158655 | A1 | 8/2003 | Obradovich et al. |
| 2003/0210228 | A1 | 11/2003 | Ebersole et al. |
| 2004/0107043 | A1 | 6/2004 | de Silva |
| 2004/0234933 | A1 | 11/2004 | Dawson et al. |
| 2004/0239699 | A1 | 12/2004 | Uyttendaele et al. |
| 2004/0247173 | A1 | 12/2004 | Nielsen et al. |
| 2004/0257436 | A1 | 12/2004 | Koyanagi et al. |
| 2005/0004749 | A1 | 1/2005 | Park |
| 2005/0116964 | A1 | 6/2005 | Kotake et al. |
| 2005/0195096 | A1 | 9/2005 | Ward et al. |
| 2005/0254621 | A1 | 11/2005 | Kalender et al. |
| 2006/0073853 | A1 | 4/2006 | Cighir et al. |
| 2006/0074549 | A1 | 4/2006 | Takahashi et al. |
| 2006/0098010 | A1 | 5/2006 | Dwyer et al. |
| 2006/0132482 | A1 | 6/2006 | Oh |
| 2006/0132602 | A1 | 6/2006 | Muto et al. |
| 2006/0195475 | A1 | 8/2006 | Logan et al. |
| 2006/0228019 | A1 | 10/2006 | Rahmes et al. |
| 2006/0238379 | A1 | 10/2006 | Kimchi et al. |
| 2006/0238380 | A1 | 10/2006 | Kimchi et al. |
| 2006/0238381 | A1 | 10/2006 | Kimchi et al. |
| 2006/0238382 | A1 | 10/2006 | Kimchi et al. |
| 2006/0238383 | A1 | 10/2006 | Kimchi et al. |
| 2006/0241859 | A1 | 10/2006 | Kimchi et al. |
| 2006/0241860 | A1 | 10/2006 | Kimchi et al. |
| 2006/0268153 | A1 | 11/2006 | Rice et al. |
| 2007/0024612 | A1 | 2/2007 | Balfour |
| 2007/0035563 | A1 | 2/2007 | Biocca et al. |
| 2007/0110338 | A1 | 5/2007 | Snavely et al. |
| 2007/0201752 | A1 | 8/2007 | Gormish et al. |
| 2007/0210937 | A1 | 9/2007 | Smith et al. |
| 2007/0237420 | A1 | 10/2007 | Steedly et al. |
| 2007/0265781 | A1 | 11/2007 | Nemethy et al. |
| 2007/0273558 | A1 | 11/2007 | Smith et al. |
| 2007/0273758 | A1 | 11/2007 | Mendoza et al. |
| 2008/0027985 | A1 | 1/2008 | Kasperkiewicz et al. |
| 2008/0028341 | A1 | 1/2008 | Szeliski et al. |
| 2008/0043020 | A1 * | 2/2008 | Snow ............ G06T 17/05 345/427 |
| 2008/0069480 | A1 | 3/2008 | Aarabi et al. |
| 2008/0089558 | A1 | 4/2008 | Vadon et al. |
| 2008/0143709 | A1 | 6/2008 | Fassero et al. |
| 2008/0189031 | A1 | 8/2008 | Meadow et al. |
| 2008/0195315 | A1 | 8/2008 | Hu et al. |
| 2008/0221843 | A1 | 9/2008 | Shenkar et al. |
| 2008/0231700 | A1 | 9/2008 | Schultz et al. |
| 2008/0309668 | A1 | 12/2008 | Borovikov |
| 2009/0073191 | A1 | 3/2009 | Smith et al. |
| 2009/0092277 | A1 | 4/2009 | Ofek et al. |
| 2009/0100767 | A1 | 4/2009 | Kondo et al. |
| 2009/0128549 | A1 * | 5/2009 | Gloudemans ............ G06T 15/20 345/419 |
| 2009/0210277 | A1 * | 8/2009 | Hardin ............ G06Q 10/00 705/7.23 |
| 2009/0237403 | A1 | 9/2009 | Horii et al. |
| 2009/0327024 | A1 | 12/2009 | Nielsen et al. |
| 2010/0079501 | A1 | 4/2010 | Ikeda et al. |
| 2010/0085350 | A1 | 4/2010 | Mishra et al. |
| 2010/0118025 | A1 | 5/2010 | Smith et al. |
| 2010/0182264 | A1 * | 7/2010 | Hahn ............ G06F 1/1626 345/173 |
| 2010/0211920 | A1 * | 8/2010 | Westerman ......... G06F 3/04883 715/863 |
| 2010/0232770 | A1 | 9/2010 | Prestenback et al. |

(56) References Cited

U.S. PATENT DOCUMENTS

| | | | |
|---|---|---|---|
| 2010/0238164 A1 | 9/2010 | Steedly et al. | |
| 2010/0269039 A1* | 10/2010 | Pahlavan | G06F 3/0481 715/702 |
| 2010/0289826 A1 | 11/2010 | Park et al. | |
| 2010/0295971 A1 | 11/2010 | Zhu | |
| 2010/0299630 A1* | 11/2010 | McCutchen | H04N 7/18 715/803 |
| 2010/0309167 A1 | 12/2010 | Nam | |
| 2010/0332513 A1 | 12/2010 | Azar et al. | |
| 2011/0082846 A1 | 4/2011 | Bamba et al. | |
| 2011/0090337 A1 | 4/2011 | Klomp et al. | |
| 2011/0091076 A1 | 4/2011 | Schultz et al. | |
| 2011/0205341 A1* | 8/2011 | Wilson | G06F 3/011 348/51 |
| 2011/0212717 A1 | 9/2011 | Rhoads et al. | |
| 2011/0244919 A1 | 10/2011 | Aller et al. | |
| 2011/0302527 A1* | 12/2011 | Chen | G06F 3/0488 715/800 |
| 2011/0310088 A1 | 12/2011 | Adabala et al. | |
| 2011/0312374 A1 | 12/2011 | Chen et al. | |
| 2012/0072863 A1 | 3/2012 | Akifusa | |
| 2012/0086725 A1 | 4/2012 | Joseph et al. | |
| 2012/0200702 A1 | 8/2012 | Wilson et al. | |
| 2012/0263397 A1 | 10/2012 | Kimura | |
| 2012/0301039 A1 | 11/2012 | Maunder et al. | |
| 2013/0059558 A1* | 3/2013 | Gehlen | G08G 1/0965 455/404.1 |
| 2013/0104076 A1 | 4/2013 | Cristescu et al. | |
| 2013/0132366 A1 | 5/2013 | Pieper | |
| 2013/0174072 A9 | 7/2013 | Nielsen et al. | |
| 2013/0222385 A1 | 8/2013 | Dorsey et al. | |
| 2013/0321290 A1 | 12/2013 | Oh et al. | |
| 2013/0345980 A1* | 12/2013 | van Os | G01C 21/3626 701/538 |
| 2014/0007022 A1* | 1/2014 | Tocino Diaz | G06F 3/017 715/863 |
| 2014/0019917 A1* | 1/2014 | Piemonte | G06F 3/017 715/848 |
| 2017/0038941 A1* | 2/2017 | Pylappan | G06F 3/04815 |

FOREIGN PATENT DOCUMENTS

| | | |
|---|---|---|
| CN | 1689525 A | 11/2005 |
| CN | 1918451 A | 2/2007 |
| EP | 0509839 A2 | 10/1992 |
| EP | 1426904 A1 | 6/2004 |
| EP | 1553521 A1 | 7/2005 |
| EP | 1612707 A2 | 1/2006 |
| JP | 2003141562 A | 5/2003 |
| JP | 2003219403 A | 7/2003 |
| JP | 2004319984 | 11/2004 |
| JP | 2005006081 A | 1/2005 |
| JP | 2005250560 A | 9/2005 |
| JP | 2006030208 A | 2/2006 |
| JP | 2006068301 A | 3/2006 |
| JP | 2007110675 A | 4/2007 |
| JP | 2010510309 | 4/2010 |
| WO | 2006053271 A1 | 5/2006 |

OTHER PUBLICATIONS

P. Coppin, I. Jonckheere, K. Nackaerts, B. Muys and E. Lambin, Digital Change Detection Methods in Ecosystem Monitoring: A Review, May 10, 2004, 32 pages.

Hernandez, C., Vogiatzis, G., & Furukawa, Y. (Jun. 14, 2010). 3d Shape Reconstruction from Photographs: a Multi-View Stereo Approach. Half-day tutorial at CVPR 2010, 3 pages. Retrieved from: <http://carlos-hernandez.org/cvpr2010/>.

Avanish Kushal, Ben Self, Yasutaka Furukawa, David Gallup, Carlos Hernandez, Brian Furless and Steven M. Seitz, Photo Tours, 2012, 8 pages.

Noah Snavely, Rahul Garg, Steven M. Seitz, and Richard Szeliski, Finding Paths Through The Worlds's Photos, 2008, 11 pages.

"Photo Tourism Exploring Photo Collections in 3D" [online], Retrieved Jul. 25, 2013, <phototour.cs.washington.edu>, 2 pages.

Noah Snavely, Steven M. Seitz, and Richard Szeliski, "Photo Tourism: Exploring Photo Collections in 3D" Power Point presentation, 2006, 79 pages.

Bing Maps Tile System, http://msdn.microsoft.com/en-us/library/bb259689(v=MSDN.10).aspx, retrieved from the Internet on Apr. 5, 2010, 13 pages.

Working with 3D, http://msdn.microsoft.com/en-us/library/cc451896(v=MSDN.10).aspx, retrieved from the Internet on Apr. 5, 2010, 17 pages.

Importing and Mapping Data, http://msdn.microsoft.com/en-us/library/bb259689(v=MSDN.10).aspx, retrieved from the Internet on Apr. 5, 2010, 17 pages.

Toyama, K. et al., "Geographic Location Tags on Digital Images," Proceeding Multimedia '03 Proceedings of the eleventh ACM International Conference on Multimedia, pp. 156-166.

Foy, Laura, Channel 9, "First Look: Streetside in Bing Maps", Posted: Dec. 2, 2009, <http://channel9.msdn.com/blogs/laurafoy/first-look-streetside-in-bing-maps>.

Microsoft, Inc., "What is Photosynth?—About—Photosynth," http://photosynth.net/about.aspx, p. 1-2.

Woldberg, George, "Geometrick Transformation Techniques for Digital Images: A Survey." (1988).

Microsoft Inc., "Mobile Panoramas", Microsoft Photosynth, <http://photosynth.net/mobile.aspx>, printed on Aug. 21, 2014.

Microsoft Inc., "How Does it Work?", Microsoft Photosynth, <http://photosynth.net/Background.aspx>, printed on Aug. 21, 2014.

Microsoft Inc., "FAQ", Microsoft Photosynth, <http://photosynth.net/faq.aspx>, printed on Aug. 21, 2014.

Microsoft Inc., "Publishing Panoramas to Photpsynth", Microsoft Photosynth, <http://photosynth.net/ice.aspx>, printed on Aug. 21, 2014.

Microsoft Inc., "Photosynth Help", Microsoft Photosynth, <http://photosynth.net/help.aspx>, printed on Aug. 21, 2014.

Kaminsky et al. "Alignment of 3D Clouds to Overhead Images," Computer Vision and Pattern Recognition Workshops, 2009, CVPR Workshops 2009. IEEE Computer Society Conference on. IEEE, 2009.

Author: Digial Inspiration, Title: "How to Embed FLV Flash Videos in your Blog?", URL:http://labnol.blogspot.com/2006/08/how-to-embed-flv-flash-videos-in-your.- html.

Kimber, et al.; "FlyAbout: Spatially Indexed Panoramic Video," Proceedings of the ninth ACM international conference on Multimedia; pp. 339-347; 2001.

Pegoraro, Rob. "Mapping That Puts You There"; The Washington Post; May 31, 2007; p. D1. 2 pages.

Kourogi et al., A Panorama-Based Method of Personal Positioning and Orientation and Its Real-time Applications for Wearable Computers, ISWC2001 in Zurich, Switzerland, pp. 107-114 (2001).

Kang et al., Virtual Navigation of Complex Scenes Using Clusters of Cylindrical Panoramic Images, Cambridge Research Laboratory—Technical Report Series, CRL 97/5, Sep. 1997, pp. 1-22.

Chen, Shenchang Eric, "QuickTime.RTM. VR—An Image-Based Approach to Virtual Environment Navigation," Apple Computer, Inc., Computer Graphics Proceedings, Annual Conference Series, Aug. 6, 1995, pp. 29-38.

Dykes, J., "An approach to virtual environments for visualization using linked geo-referenced panoramic imagery," Computers, Environment and Urban Systems, 24, 2000, pp. 127-152.

Hirose, Michitaka, "Image-Based Virtual World Generation," IEEE MultiMedia, 1997, pp. 27-33.

Kato, et al., "Town digitizing: Recording of street views by using omnidirectional vision sensors," IEEE, 2000, pp. 2571-2576.

Tanikawa et al., "Building a photo-realistic virtual world using view-dependent images and models," IEEE, 1999, pp. VI-98 to VI-103.

Zheng and Tsuji, "Panoramic Representation for Route Recognition by a Mobile Robot," International Journal of Computer Vision, 9:1, Kluwer Academic Publishers, The Netherlands, 1992, pp. 55-76.

Zheng and Tsuji, "Panoramic Representation of Scenes for Route Understanding," IEEE, 1990, pp. 161-167.

(56) References Cited

OTHER PUBLICATIONS

Lippman, Andrew, "Movie-Maps: An Application of the Optical Videodisc to Computer Graphics," ACM, 1980, pp. 32-42.
Uyttendaele et al., "Image-Based Interactive Exploration of Real-World Environments," IEEE Computer Society, May/Jun. 2004, pp. 52-63.
Thomas H. Kolbe, "Augmented Videos and Panoramas for Pedestrian Navigation," Proceedings of the 2nd Symposium on Location Based Services & TeleCartography Jan. 28-29, 2004, in Vienna, pp. 7/16-16/16.
Boult, et al., "Omnidirectional Video Applications", 2000.
Foote, et al., "FlyCam: Practical Panoramic Video and Automatic Camera Control", copyright 2000.
Wikipedia, "QuickTime VR," Nov. 7, 2007. Downloaded from http://en.wikipedia.org/wiki/QuickTime VR on Dec. 28, 2007, 3 pages.
Apple Inc., "QuickTime VR," 2007. Downloaded from http://www.apple.com/quicktime/technologies/qtvr/ on Dec. 28, 2007, 3 pages.
Microsoft Corp. "Windows Live Local—Virtual Earth Technology Preview"; 2005. Downloaded from http://preview.local.live.com/ on Oct. 26, 2007.1 page.
Darken, R. and Cevik, H., "Map Usage in Virtual Environments: Orientation Issues," Proceedings of the IEEE Virtual Reality Conference, pp. 133-140, IEEE, 1999.
Dykes, J. et al., "Virtual environments for student fieldwork using networked components," International Journal of Geographical Information Science, vol. 13, No. 4, pp. 397-416, Taylor & Francis Ltd., 1999.
Murphy, D. W. et al., Air-Mobile Ground Surveillance and Security System (AMGSSS) Project Summary Report, Technical Document 2914, Defense Special Weapons Agency (DSWA) and Physical Security Equipment Management Office (PSEMCO), 80 pages, Sep. 1996.
Nguyen, H. G. et al., "Virtual Systems: Aspects of the Air-Mobile Ground Security and Surveillance System Prototype," Unmanned Systems, vol. 14, No. 1, 11 pages, Winter 1996.
Wei, S. et al., "Color Anaglyphs for Panorama Visulizations", Communication and Information Technology Research Technical Report ("CITR-TR"), No. 19, pp. 2-15, Feb. 1998.
Thomas H. Kolbe, Bonn, "Augmented Videos and Panoramas for Pedestriant Navigation," Proceedings of the 2nd Symposium on Location Based Services & TeleCartography 2004.
Google Maps, "Introducing Smart Navigation in Street View: Double-Click to go(anywhere!)", <http://google-latlong.blogspot.com/2009/06/introducing-smart-navigation-in-street.html>, Jun. 2009, 8 pgs.
International Search Report and Written Opinion for PCT Application No. PCT/US2016/066342, dated Jul. 19, 2017. 19 pages.
International Preliminary Report on Patentability for PCT Application No. PCT/US2016/066342, dated Jun. 28, 2018. 15 pages.

\* cited by examiner

500

600

900

1100

1200

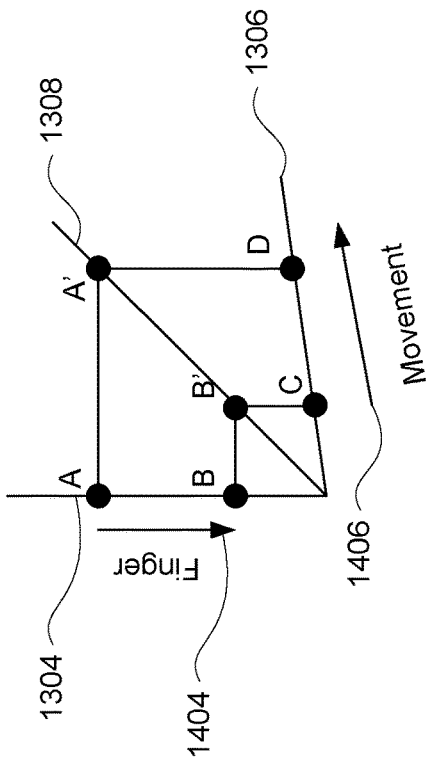
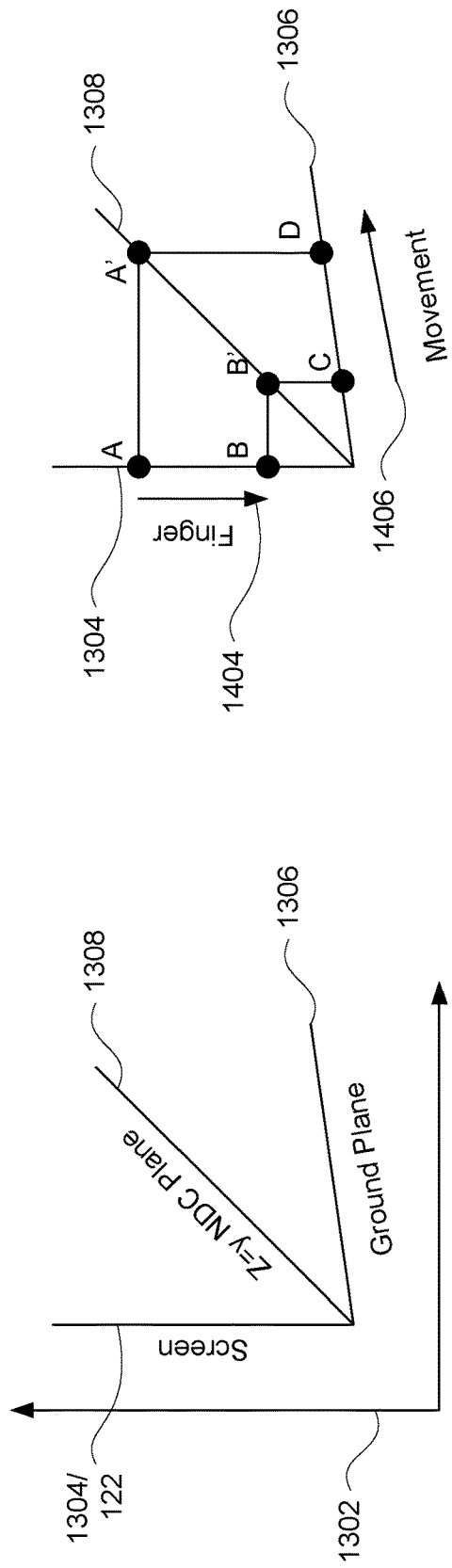
FIGURE 14
FIGURE 13

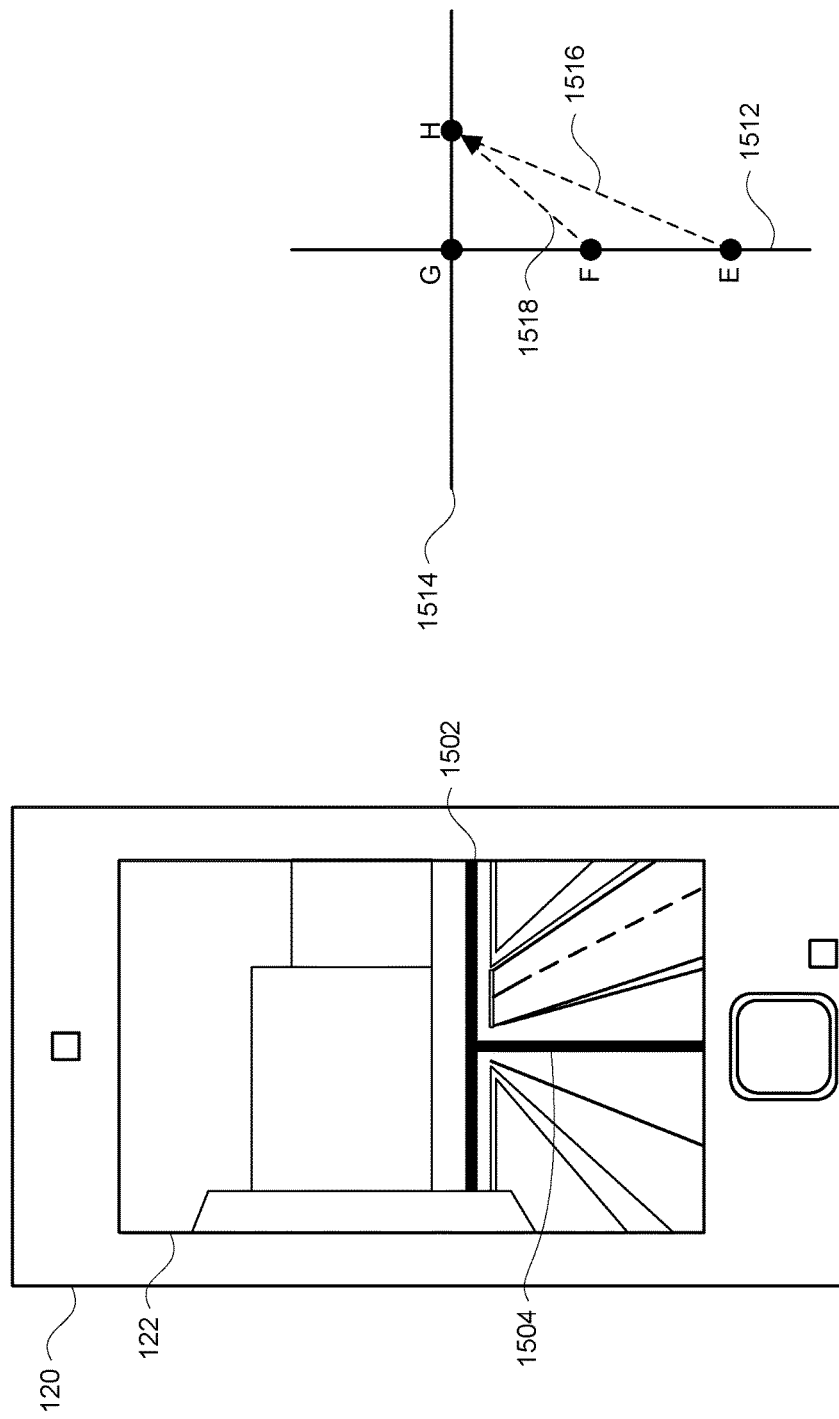

NAVIGATION THROUGH MULTIDIMENSIONAL IMAGES SPACES

BACKGROUND

Various systems allow users to view images in sequences, such as in time or space. In some examples, these systems can provide a navigation experience in a remote or interesting location. Some systems allow users to feel as if they are rotating within a virtual world by clicking on the edges of a displayed portion of a panorama and having the panorama appear to "move" in the direction of the clicked edge.

SUMMARY

One aspect of the disclosure provides a computer-implemented method of navigating multidimensional spaces. The method includes providing, by one or more processors, a first image of a multidimensional space for display on a display of a client computing device and an overlay line extending across a portion of the first image and indicating a direction in which the multidimensional space extends into the first image such that a second image is connected to the first image along a direction of the overlay line; receiving, by the one or more processors, user input indicating a swipe across a portion of the display, the swipe being defined by a starting pixel and an ending pixel of the display; determining, by the one or more computing devices, based on the starting pixel and the ending pixel, that the swipe occurred at least partially within an interaction zone of the first image, the interaction zone defining an area around the overlay line at which the user can interact with the multidimensional space; when the swipe occurred at least partially within the interaction zone, determining, by the one or more processors, that the swipe indicates a request to display an image different from the first image; when the swipe indicates a request to display the image different from the first image, selecting, by the one or more computing devices, the second image based on the starting point of the swipe, the ending point of the swipe, and a connection graph connecting the first image and the second image along the direction of the overlay line; and providing, by the one or more computing devices, the second image for display on the display in order to providing a feeling of movement in the multidimensional space.

In one example, the method also includes providing a transition image for display between the first image and the second image, the transition image being provided as a thumbnail image with less detail than the first image and the second image. In another example, the method also includes providing instructions to fade the overlay line out after a threshold period of time has passed without any user action with the overlay line. In this example, after fading the overlay line out, the method includes receiving second user input on the display and providing instructions to redisplay the overlay line in response to the second user input. In another example, the method also includes determining a direction and magnitude of the swipe based on the starting pixel of the swipe and the ending pixel of the swipe, and selecting the second image is further based on the direction and magnitude.

In another example, the method also includes providing the second image with a second overlay line extending across a portion of the second image and indicating a direction in which the multidimensional space extends into the second image such that a third image is connected to the second image along a direction of the second overlay line in the connection graph. In this example, the method includes receiving second user input indicating a second swipe, determining that the second swipe is within a threshold angle perpendicular to the direction in which the multidimensional space extends into the second image, and when the second swipe is within a threshold angle perpendicular to the direction in which the multidimensional space extends into the second image, panning across multidimensional space of the second image. Alternatively, the method also includes receiving second user input indicating a second swipe, determining that the second swipe is within a threshold angle perpendicular to the direction in which the multidimensional space extends into the second image, and when the second swipe is within a threshold angle perpendicular to the direction in which the multidimensional space extends into the second image, changing the orientation within the second image. In another alternative, the method also includes receiving second user input indicating a second swipe, determining that the second swipe is within a threshold angle perpendicular to the direction in which the multidimensional space extends into the second image, and when the second swipe is within a threshold angle perpendicular to the direction in which the multidimensional space extends into the second image, switching from the second image to a third image located on a second connection graph adjacent to the connection graph, the second image and the third image having no direction connection in the connection graph. In this example, the method also includes providing for display with the second image, a third overlay line, the third overlay line representing a second navigation path proximate to a current view of the second image, the third overlay line being provided such that the third overlay line and the second overlay line cross over one another when displayed with the second image. In addition, the method includes receiving second user input along the third overlay line indicating a request to transition from an image along the second overlay line to an image along the third overlay line and in response to the second user input, providing a third image for display, the third image being arranged along the third overlay line in the connection graph. Further, the method includes selecting a set of images for display in series as a transition between the second image and the third image based on connections between images in the connection graph and providing the set of images for display on the display. In addition, prior to providing the set of images, the method also includes filtering the set of images to remove at least one image based on a connection between two images of the set of images in a second connection graph different from the first connection graph such that the filtered set of images are provided for display as the transition between the second image and the third image.

Another aspect of the disclosure provides a system. The system includes one or more computing devices, each having one or more processors. The one or more computing devices are configured to provide a first image of a multidimensional space for display on a display of a client computing device and an overlay line extending across a portion of the first image and indicating a direction in which the multidimensional space extends into the first image such that a second image is connected to the first image along a direction of the overlay line; receive user input indicating a swipe across a portion of the display, the swipe being defined by a starting pixel and an ending pixel of the display; determine, based on the starting pixel and the ending pixel, that the swipe occurred at least partially within an interaction zone of the first image, the interaction zone defining an area around the overlay line at which the user can interact with the multidimensional space; when the swipe occurred at least partially within the interaction zone, determine that the swipe indicates a request to display an image different from the first image; when the swipe indicates a request to display the image different from the first image, select the second image based on the starting point of the swipe, the ending point of the swipe, and a connection graph connecting the first image and the second image along the direction of the overlay line; and provide the second image for display on the display in order to providing a feeling of movement in the multidimensional space.

In one example, the one or more computing devices are further configured to provide a transition image for display between the first image and the second image, the transition image being provided as a thumbnail image with less detail than the first image and the second image. In another example, the one or more computing devices are further configured to provide instructions to fade the overlay line out after a threshold period of time has passed without any user action with the overlay line. In this example, the one or more computing devices are further configured to, after fading the overlay line out, receive second user input on the display and provide instructions to redisplay the overlay line in response to the second user input. In another example, the one or more computing devices are further configured to determine a direction and magnitude of the swipe based on the starting pixel of the swipe and the ending pixel of the swipe and to select the second image further based on the direction and magnitude. In another example, the one or more computing devices are further configured to provide the second image with a second overlay line extending across a portion of the second image and indicating a direction in which the multidimensional space extends into the second image such that a third image is connected to the second image along a direction of the second overlay line in the connection graph.

A further aspect of the disclosure provides a non-transitory, computer-readable storage device on which computer readable instructions of a program are stored. The instructions, when executed by one or more processors, cause the one or more processors to perform a method. The method includes providing a first image of a multidimensional space for display on a display of a client computing device and an overlay line extending across a portion of the first image and indicating a direction in which the multidimensional space extends into the first image such that a second image is connected to the first image along a direction of the overlay line; receiving user input indicating a swipe across a portion of the display, the swipe being defined by a starting pixel and an ending pixel of the display; determining, based on the starting pixel and the ending pixel, that the swipe occurred at least partially within an interaction zone of the first image, the interaction zone defining an area around the overlay line at which the user can interact with the multidimensional space; when the swipe occurred at least partially within the interaction zone, determining that the swipe indicates a request to display an image different from the first image; when the swipe indicates a request to display the image different from the first image, selecting the second image based on the starting point of the swipe, the ending point of the swipe, and a connection graph connecting the first image and the second image along the direction of the overlay line; and providing the second image for display on the display in order to providing a feeling of movement in the multidimensional space.

BRIEF DESCRIPTION OF THE DRAWINGS

FIG. 13 is another representation of example data in accordance with aspects of the disclosure.

FIG. 14 is a further representation of example data in accordance with aspects of the disclosure.

FIG. 15A is another example client computing device and screen shot in accordance with aspects of the disclosure.

FIG. 15B is an example representation of an image graph in accordance with aspects of the disclosure.

DETAILED DESCRIPTION

Overview

Figure 1:
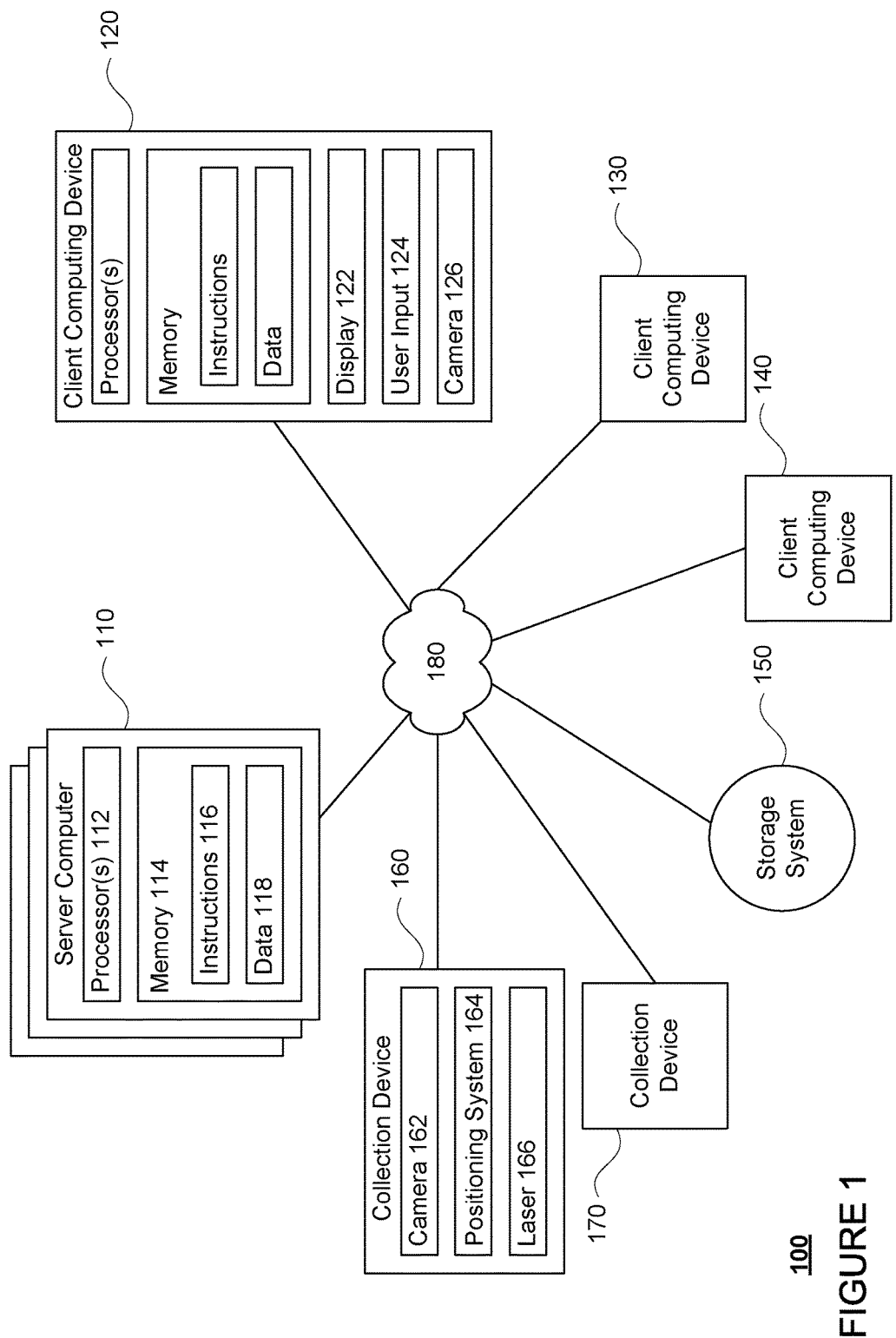
FIG. 1 is a functional diagram of an example system in accordance with aspects of the disclosure.

The technology relates to an interface for enabling a user to navigate within a multidimensional environment in first or third person view. In some examples, the environment may include a three dimensional model rendered by mapping images to the model or a series of geolocated (for example, begin associated with orientation and location information) images with information identifying the two or three dimensional relationships of these images with one another.

To provide for "realistic" motion in multidimensional space, the interface may allow continuous motion, intuitive turning, looking around the scene and moving forwards and backwards. For example, a reference line may be displayed to indicate to a user a direction in which the user may "traverse" in the multidimensional space using a touch and/or motion controls. By swiping in different directions relative to the line, the interface may easily recognize when and the direction in which the user is trying to move as compared to when the user is attempting to simply change the orientation and look around.

In order to provide the interface, a plurality of geolocated images must be available. In addition to being associated with geolocation information, the images may be connected to one another in one or more image graphs. The graphs may be generated using various techniques including manual and automated linking based on location and distance between images, the manner in which the images were captured such as where the images are captured by a camera as the camera is moved along, and other methods which identify a best image in a set of images for connecting to any given point or orientation in an image.

One or more server computing devices may access these one or more graphs in order to provide images for display to a user. For example, the user's client computing device may send a request for images identifying a location. The one or more server computing devices may access the one or more image graphs in order to identify an image corresponding to the location. This image may then be provided to the user's client computing device.

In addition to providing the image, the one or more server computing devices may provide the client computing device with instructions for displaying a navigational overlay. This overlay may be represented as a line which indicates to the user a direction in which the user can move in the multidimensional space represented by the image. The line itself may actually correspond to a connection between the image that the user is currently viewing and other images in the one or more image graphs. As an example, this line may correspond to a road along which a camera was moved in order to capture the images identified in the image graph.

The user may then use the line to navigate through the multidimensional space. For example, the line may be used to suggest to a user an interaction zone for moving from the image to a different image in the one or more image graphs. If the user swipes within the interaction zone of the line and generally parallel or within some small angle difference to the line, the user's client computing device may "move" around in the multidimensional space by transitioning to a new image according to the characteristics of the swipe and the image graph. In other examples, a swipe may be identified as a request to rotate the view within the current image or pan in the current image.

The characteristics of the swipe including direction, magnitude and speed can be used to define how the view will change. The magnitude of the swipe or the length in pixels can be used to determine whether how far to move the view forward or backward. In addition, the speed of the swipe (pixels per second), and even the acceleration of the swipe, may be used to determine how fast the view appears to move through the multidimensional space.

The direction may be determined by unprojecting (converting from two dimensions to three dimensions) the current and previous screen coordinates onto the y=z plane in normalized device coordinates (NDC) and then projecting down again onto the ground plane. This allows the vertical display movement to map to forward movement in the multidimensional space and horizontal display movement maps to map to lateral movement in the multidimensional space in a predictable way that is independent of scene geometry or the horizon.

As an example, when the user taps a view represented on a display of a client computing device, a line may appear. They user may then swipe along a portion of the display. Using the initial location or pixel(s) of the swipe and other locations along the swipe, the speed of the swipe may be determined. Once the swipe has completed or the user's finger leaves the display, a transition animation, such as zooming and fading into a new image, is displayed in order to transition to a new image.

As the view will typically traverse a plurality of images in order to reach the image identified based on the characteristics of the swipe, the full resolution of these plurality of images may not actually be displayed. Instead lower resolution versions of the images, such as thumbnail images, may be displayed as part of a transition between a current image and an identified image. When the actual identified image is displayed, this image may be displayed at the full resolution. This may save time and processing power.

The characteristics such as opacity, width, color, and location of the line may be changed in order to allow the user to more easily understand navigate a multidimensional space. In addition, in order to further reduce the interference of the line with the user's exploration of the multidimensional space, when the user is not interacting with the interface, no line may be shown. As an example, the line may be faded in an out as needed based on whether the user is interacting with the display.

In some examples, the connection graph may branch off, such as where there is an intersection of two roads, or rather, an intersection in the one or more image graphs. In order to keep the overlay simple and easy to understand, only lines that are directly connected to a current line within a short distance of the current point of view may appear overlaid on the imagery. In these branch areas, such as at a traffic intersection where more than one road intersects one another, a user may want to change from one line to another. Of course, traveling forward and making a 90 degree turn in the middle of an intersection can feel unnatural. In this regard, the one or more image graphs may be used to cut across the corners of an intersection between two lines by displaying images that are not on either line as a transition between the two lines.

The features described herein allow the use to explore while at the same time following specific, pre-determined motion path inside of the multidimensional space while at the same time preventing the user from getting "stuck" or moving in an invalid way. In addition, the system is able to recognize the difference when the user is trying to move versus when the user is trying to look around. Other systems require multiple types of inputs in order to distinguish these types of movement. These systems may also require a user to point to a specific location in order to move towards that location. This is much less intuitive than allowing a user to swipe in order to move in the multidimensional space and does not allow continuous motion because the user must tap or click on an arrow each time they want to move.

Further aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example Systems

Figure 2:
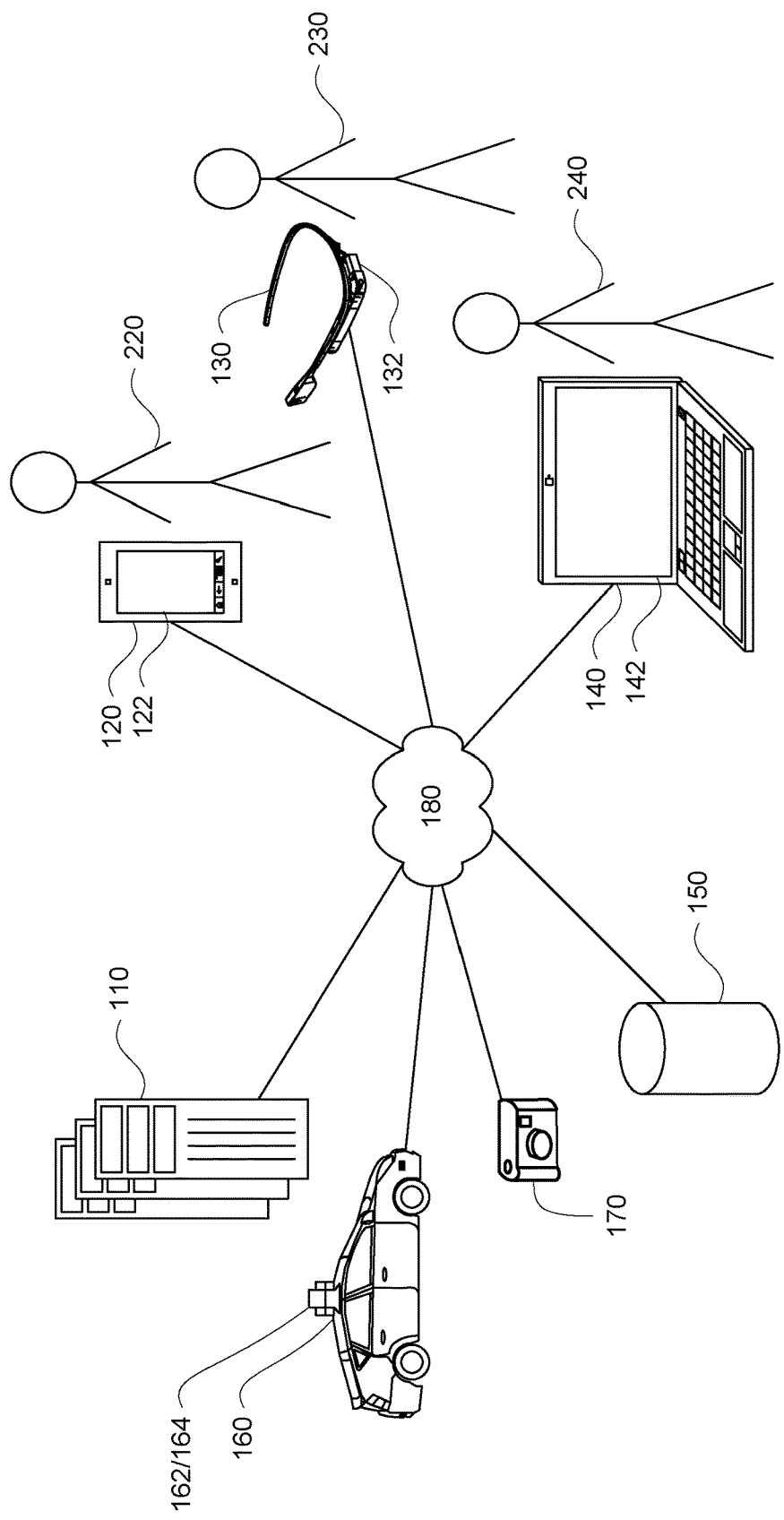
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each of computing devices 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Storage system 150 may store images and associated information such as image identifiers, orientation and location of the image, orientation and location of the camera that captured the image, as well as intrinsic camera settings (such as focal length, zoom, etc.). In addition to being associated with orientation and location information, the images may be connected to one another in one or more image graphs. In other words, from any given image, these image graphs may indicate which other images are connected to that image and in which direction.

Figure 3:
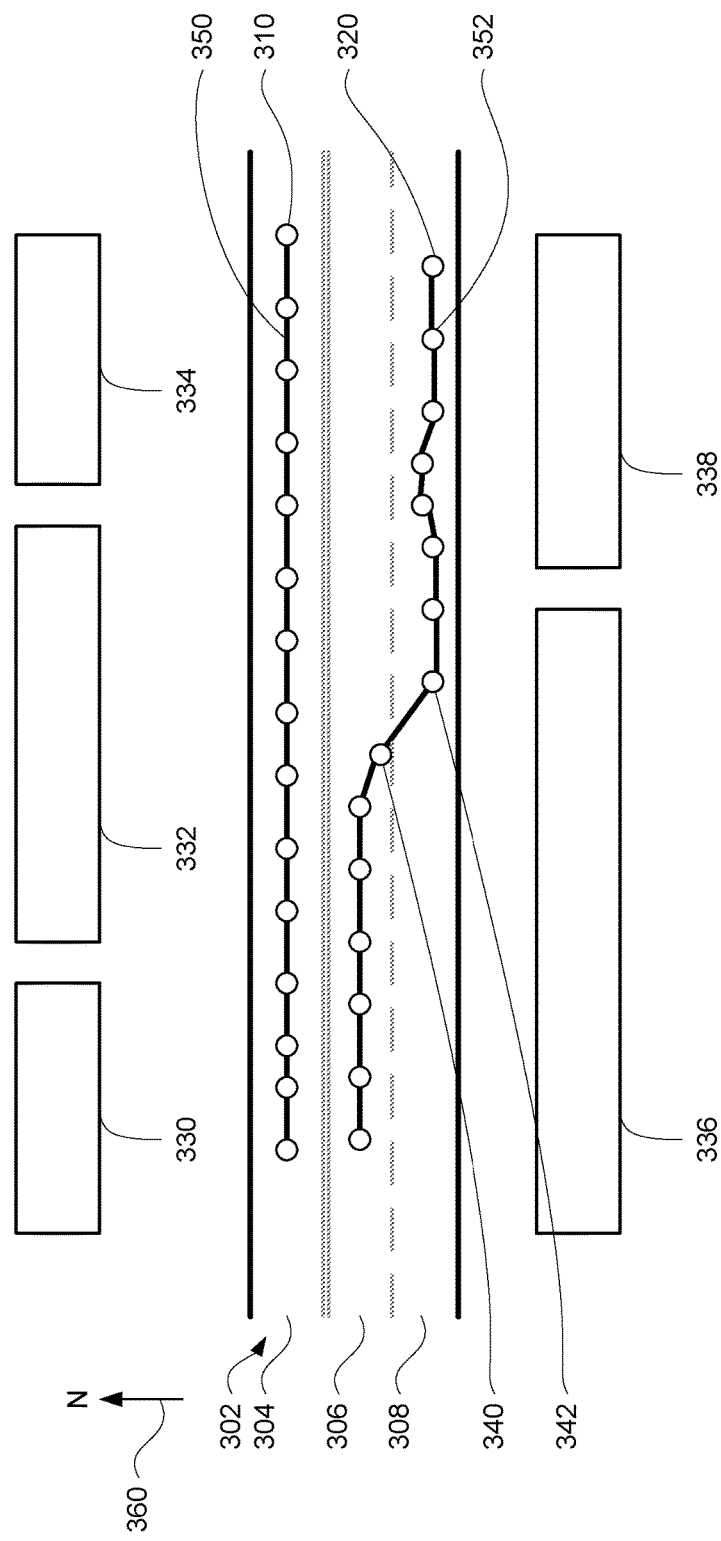
FIG. 3 is an example representation of images and data in accordance with aspects of the disclosure.

The graphs may be generated using various techniques including manual and automated linking based on location and distance between images, the manner in which the images were captured such as where the images are captured by a camera as the camera is moved along, and other methods which identify a best image in a set of images for connecting to any given point or orientation in an image. For instance, as shown in example 300 of FIG. 3 images may be captured by maneuvering a vehicle along a roadway 302. In this example, the roadway includes a plurality of lanes 304, 306, 308. At one time, a vehicle driven in lane 304 captures a series of images 310 that includes, inter alia, the features in the vehicle's environment such as the roadway 302, as well as buildings 330, 332, 334, 336, 338. At another time, that same or a different vehicle driven in lane 306 (and later switching to lane 308 between images 340 and 342) captures a series of images 320. As the camera or cameras that capture the series of images are moved along, they may associate each image with information about the location of the camera when the image was captured, the orientation of the camera when the image was captured (for instance, relative to orientation indicator 360), timestamp information indicating a date and time at which the image was captured, etc. The change in the position of the camera overtime and along the series of images may be used to "link" pairs of images together via lines 350, 352. Again, this linking may be performed manually or automatically based on the change in the position of the camera over time using the location and orientation of the camera as well as the timestamp information of the images. The linking then creates the connections of the image graphs, or information describing the relative orientation between each adjacent pair of images. In this example, the result of the linking is two image graphs corresponding to the series of images 310 and 320 and the connections between the images.

Figure 4:
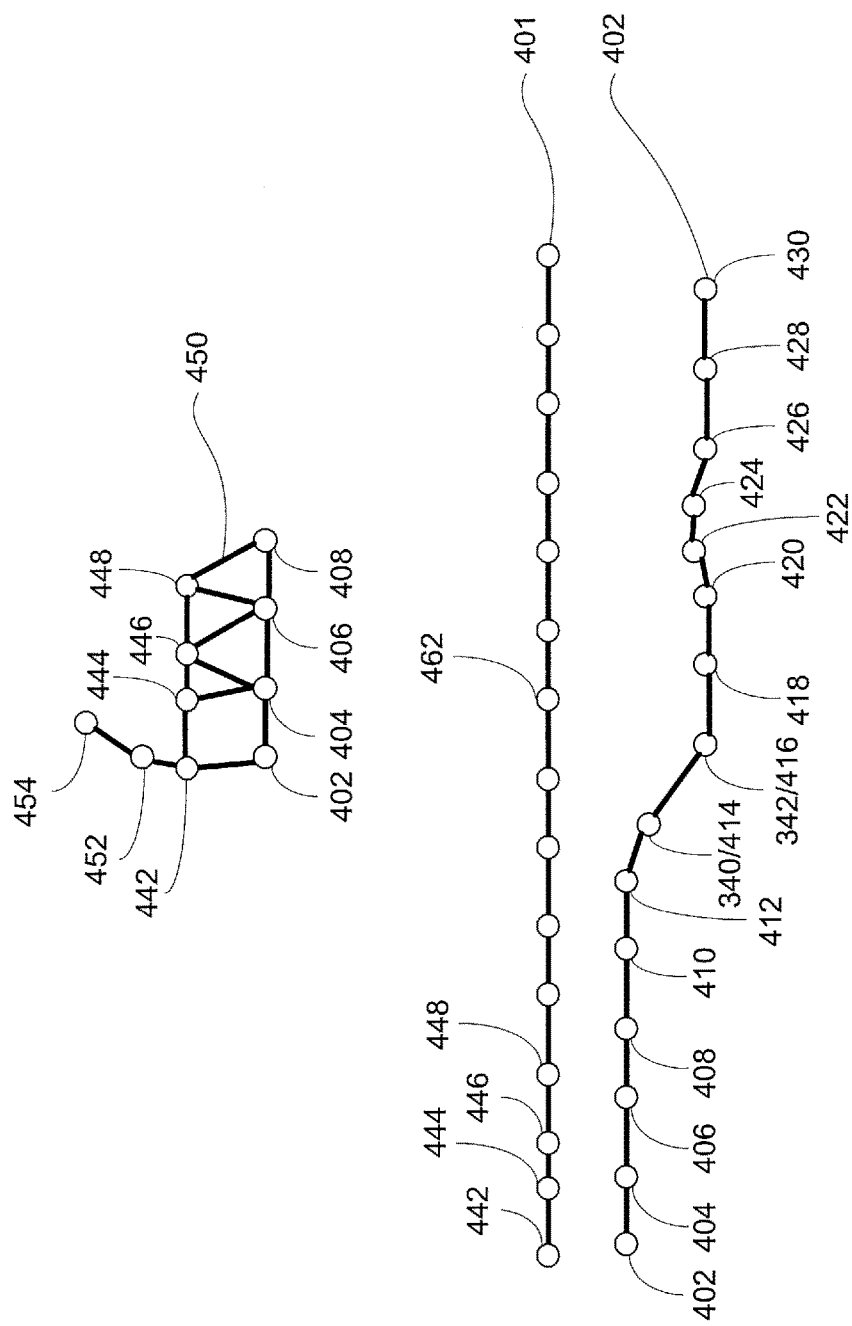
FIG. 4 are representations of example image graphs in accordance with aspects of the disclosure.

The graphs themselves may have different images and connections. FIG. 4 is an example of a series of images graphs 450, 460, and 470. In this example, the image graphs 460 and 470 may be generated from images and connections which represent only image along a street or map grid corresponding to roads, paths, etc. or by pairing down a more complex graph to only those images and connections that comprise the grid. For instance, image graphs 460 and 470 may be generated as discussed above from the series of images 310 and 320. Image graph 470 actually includes only images 402-430 that relate to the roadway 302 or grid of roadways in a map. Other connectivity graphs may then identify connections from images in the first graph to images beyond those in the first graph. For instance, image graph 450 includes connections between images 402, 404, 406, and 408 of series of images 320 and images 442, 444, 446, and 448 of series of images 322. In addition, image graph 450 includes connections with images 452 and 454 which may be images from within building 330 but which are not included in either series of images 320 or 322. Again, these connections may be drawn manually or automatically as discussed above.

Example Methods

As previously discussed, the following operations do not have to be performed in the precise order described below. Rather, as mentioned above, various operations can be handled in a different order or simultaneously, and operations may be added or omitted.

As an example, a client computing device may provide users with an image navigation experience. The client computing device may do so by communicate with one or more server computing devices in order to retrieve and display images. The one or more server computing devices may access these one or more graphs in order to provide images for display to a user. For example, the user's client computing device may send a request for images identifying a location. The one or more server computing devices may access the one or more image graphs in order to identify an image corresponding to the location. This image may then be provided to the user's client computing device.

Figure 5:
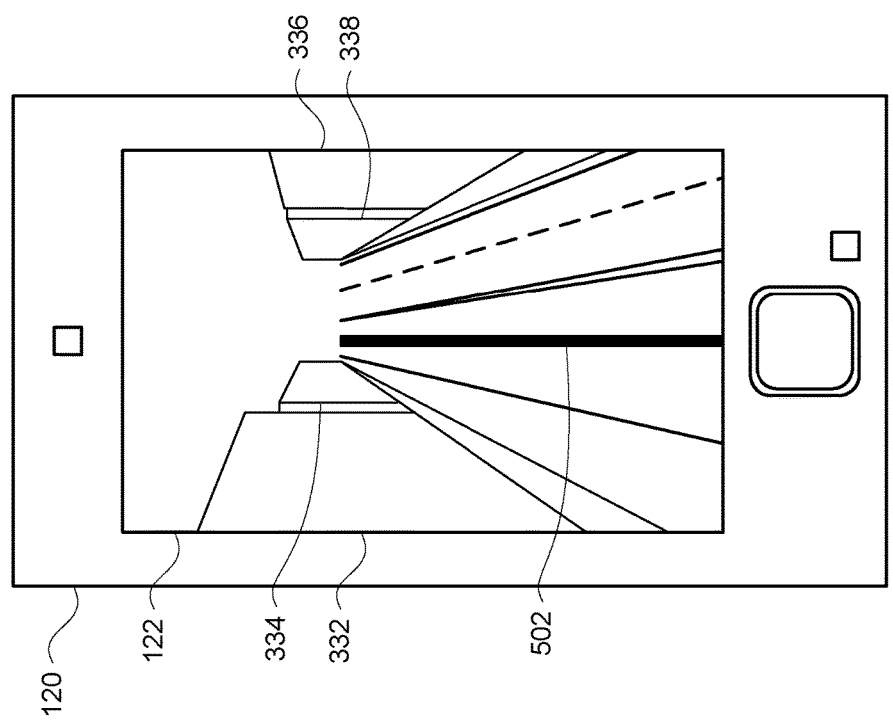
FIG. 5 is example client computing device and screen shot in accordance with aspects of the disclosure.

In addition to providing the image, the one or more server computing devices may provide the client computing device with instructions for displaying a navigational overlay. This overlay may be represented as a line which indicates to the user a direction in which the user can move in the multidimensional space. For instance, FIG. 5 is an example view 500 of image 444 of image graph 460 displayed on display 122 of computing device 120. Here an overlay line 502 is provided which indicates the direction into image 444 which the user is able to move. The line itself may actually correspond to a connection between the image 444 that the user is currently viewing and other images in the image graph 460. As can be seen in the example, image 444 includes portions of buildings 332, 334, 336, and 338.

Figure 6:
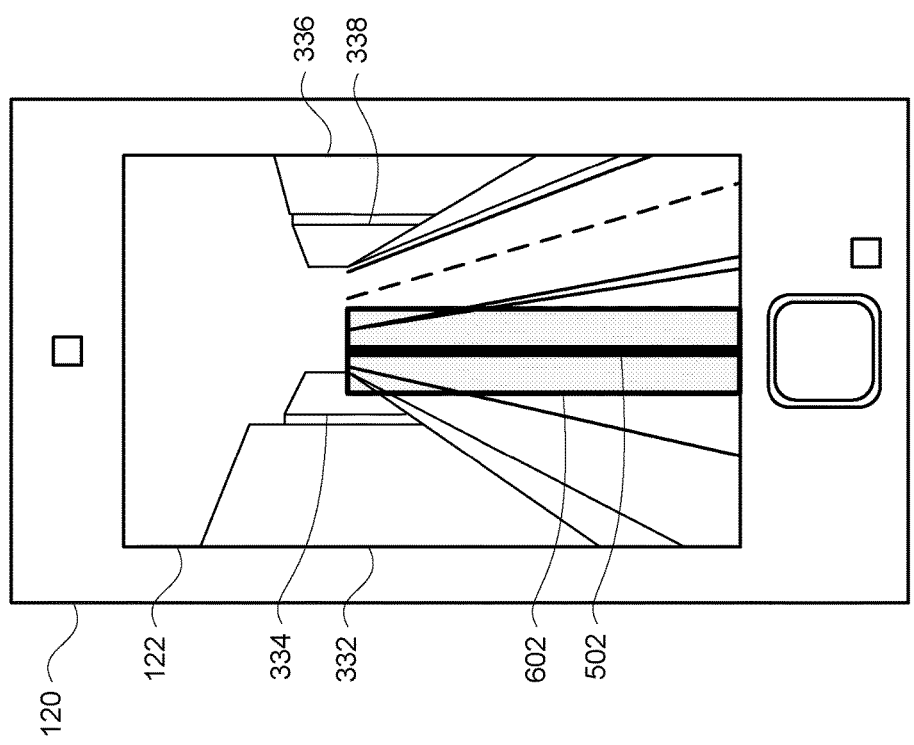
FIG. 6 is example client computing device, screen shot, and representation of data in accordance with aspects of the disclosure.
Figure 7:
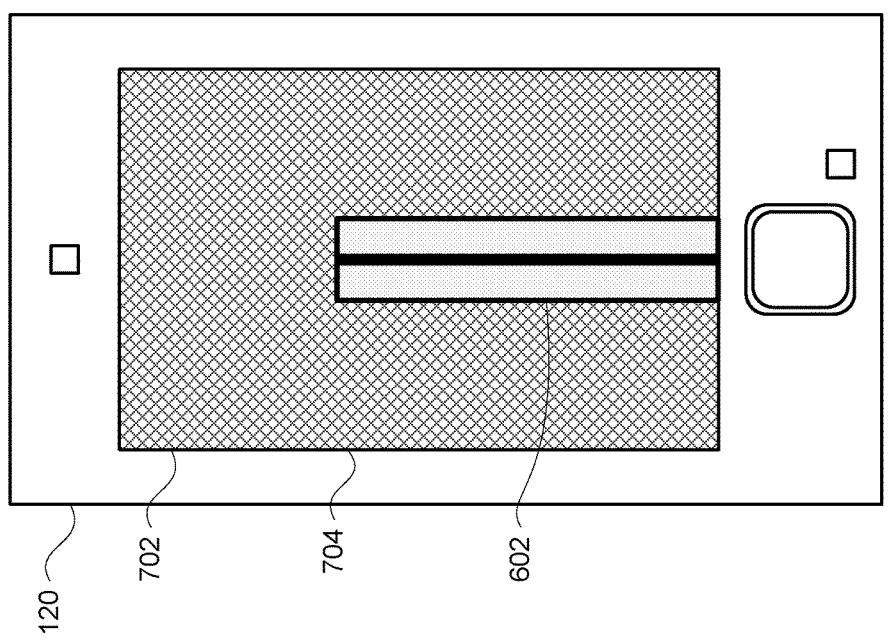
FIG. 7 is example client computing device and representation of data in accordance with aspects of the disclosure.

The user may then use the line to navigate through the multidimensional space. For example, the line may be used to suggest to a user an interaction zone for moving from the image to a different image in the one or more image graphs. As shown in the example 600 of FIG. 6, interaction zone 602 extends past the outer edges of the line 502. Although the interaction zone 602 is displayed on display 122 in FIG. 6, this interaction zone need not actually be displayed to the user and may be "hidden" in order to reduce clutter on the display. Because the interaction zone 602 extends past the outer edges of the line, this may allow some room for error when a user attempts to swipe his or her finger (or a stylus). For instance, referring to example 700 of FIG. 7, area 702 corresponds to the display 122. In this example, area 704 refers to the area of the display 122 that is outside of the interaction zone 602. Again, these areas may not necessarily be displayed to the user, and FIG. 7 is used for the purposes of illustrating the examples below more clearly.

If the user swipes within the interaction zone of the line and generally parallel or within some small angle difference to the line as client computing device may "move" around in the multidimensional space. For instance, as shown in examples 800A and 800B FIGS. 8A and 8B, the user may use a finger (or stylus) to interact with the interaction zone 602 of the line by swiping generally parallel with the line 502 in the direction of arrow 804 or 806. Because the swipe is unlikely to be exactly parallel to line 502, as shown in example 900 of FIG. 9, small angle differences ($\theta1$) such as 10 or 15 degrees from the direction of line 502 within the interaction zone 602 may be ignored or considered to be "generally" parallel.

Figure 10:
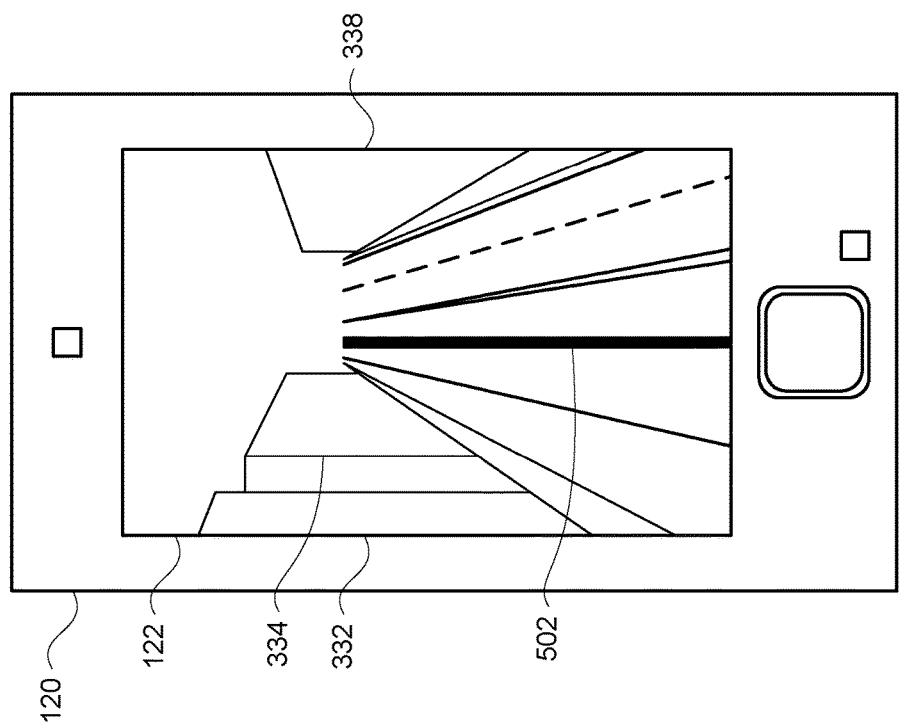
FIG. 10 is another example client computing device and screen shot in accordance with aspects of the disclosure.

Returning to FIG. 8A, when the user swipes in the direction of arrow 804, a new image may be displayed that appears to move the user within the multidimensional space. For instance, in response to a user swiping within the interaction zone 602 generally parallel to the line 502, the display may transition to another image of image graph 460. As shown in example 1000 of FIG. 10, the display transitions to image 462 of image graph 460. In this example, the display appears to have moved the user further down lane 304 and generally along line 502 such that building 336 is no longer visible. This again allows the user the feeling that he or she is moving within a three dimensional space though he or she is viewing a two dimensional image. The selection of the image that will be displayed may depend upon the characteristics of the swipe and the one or more image graphs as discussed below.

Figure 11:
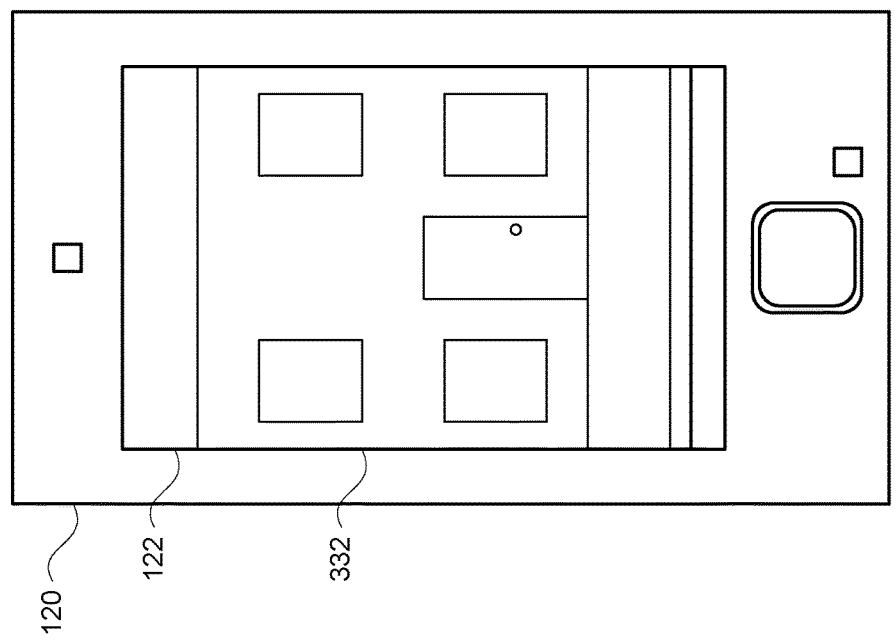
FIG. 11 is a further example client computing device and screen shot in accordance with aspects of the disclosure.

If the user swipes outside of this interaction zone 602 or rather so many pixels away from the line 502 or within some specified angle distance (for instance greater than θ1, but less than 90-θ1) to the line, rather than transitioning to a new image, the user's client computing device may change the orientation of the view of the current image, or rather rotate the view within the current image. For example, if the user were to swipe his or her finger across the display of example 600 from the left side of the display 122 towards the right side of the display 122 at an angle that is greater than θ1, but less than 90-θ1, rather than moving generally along the line 502, the display may rotate within image 444. As shown in example 1100 of FIG. 11, the display rotates from the position of example 600 within image 444 and displays more of building 332. This gives the user the feeling that he or she has rotated or changed his or her orientation as opposed to moving forward or backward within the multi-dimensional space. Thus, the interaction zone allows the client computing device to distinguish between a request to move around (i.e. move forward or backwards) and a request to change the user's orientation.

Figure 12:
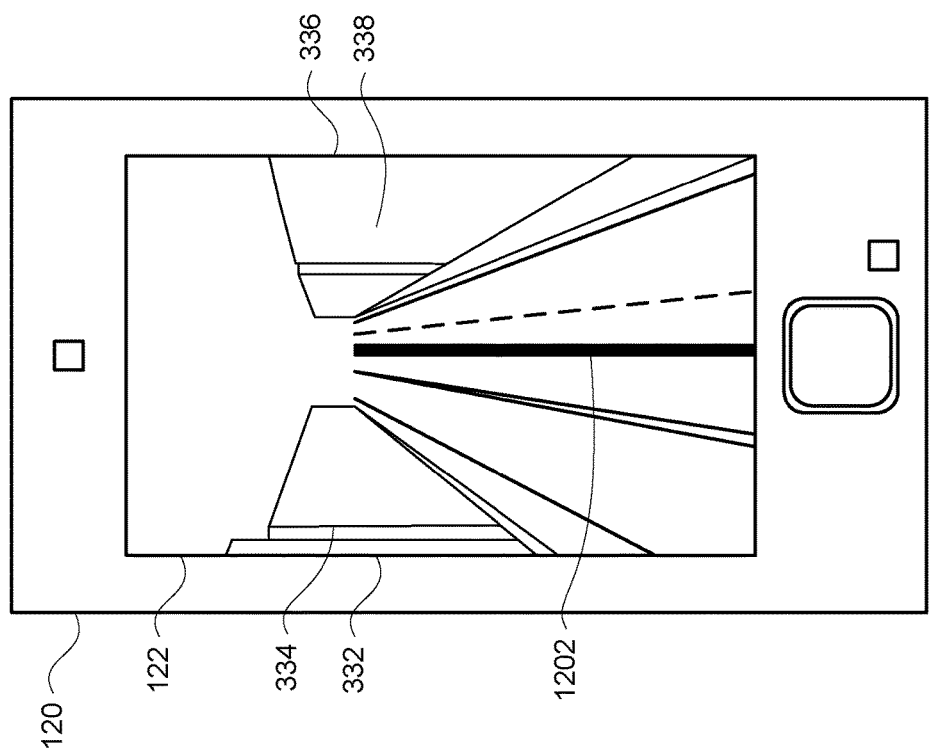
FIG. 12 is yet another example client computing device and screen shot in accordance with aspects of the disclosure.

In addition, if the user swipes generally perpendicular or within the small angle distance θ1 from perpendicular to the direction of line 502 (or less than 90-θ1 from parallel to the direction of line 502) within or outside of the interaction zone, this may indicate that the user wishes to pan (move sideways) in the current image. For example, if the user were to swipe his or her finger across the display of example 600 from the left side of the display 122 towards the right side of the display 122 at an angle that is greater 90-θ1 parallel to the direction of line 502, rather than moving generally along the line 502 or rotating within image 444, the display may pan within the current image. In this regard, if there is more than one line according to the one or more image graphs, this movement may cause the view to actually "jump" to a different line. For instance, from image 444, the display may jump to image 404 of image graph 420 as shown in example 1200 of FIG. 12. Here, the user appears to have panned from a point within lane 304 to a point within lane 306 by moving between images 444 and 402. At his point, a new overlay 1202 corresponding to the image graph 420 may be provided for display with image 404.

Figure 8A:
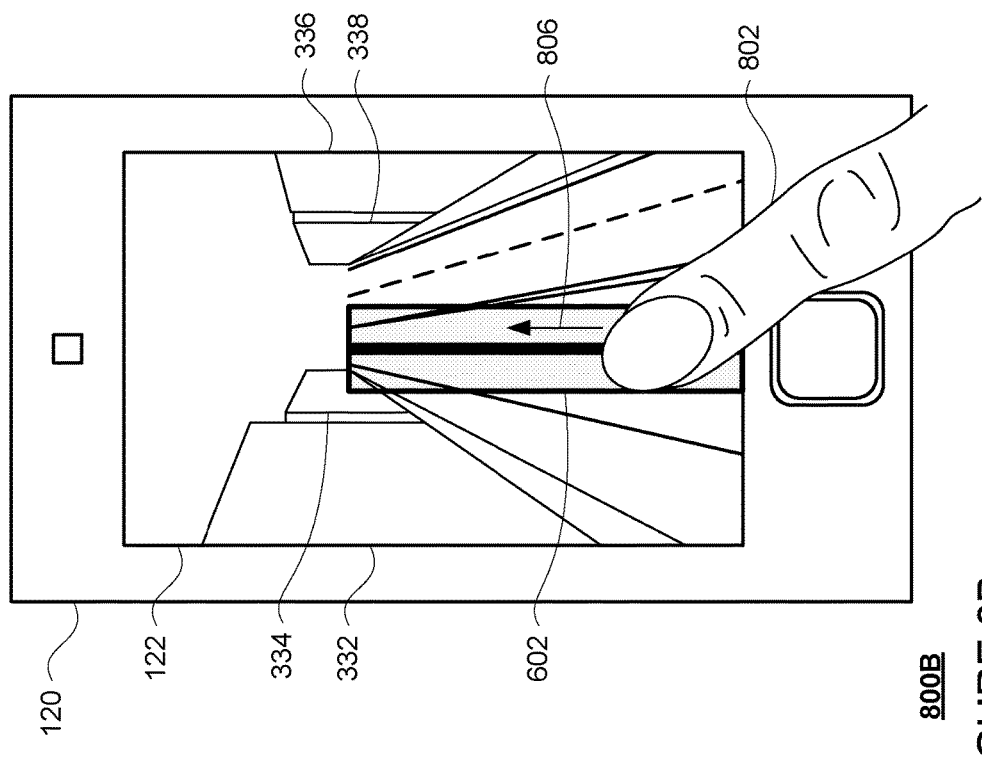
FIGS. 8A and 8B are an example of user input in accordance with aspects of the disclosure.
Figure 8B:
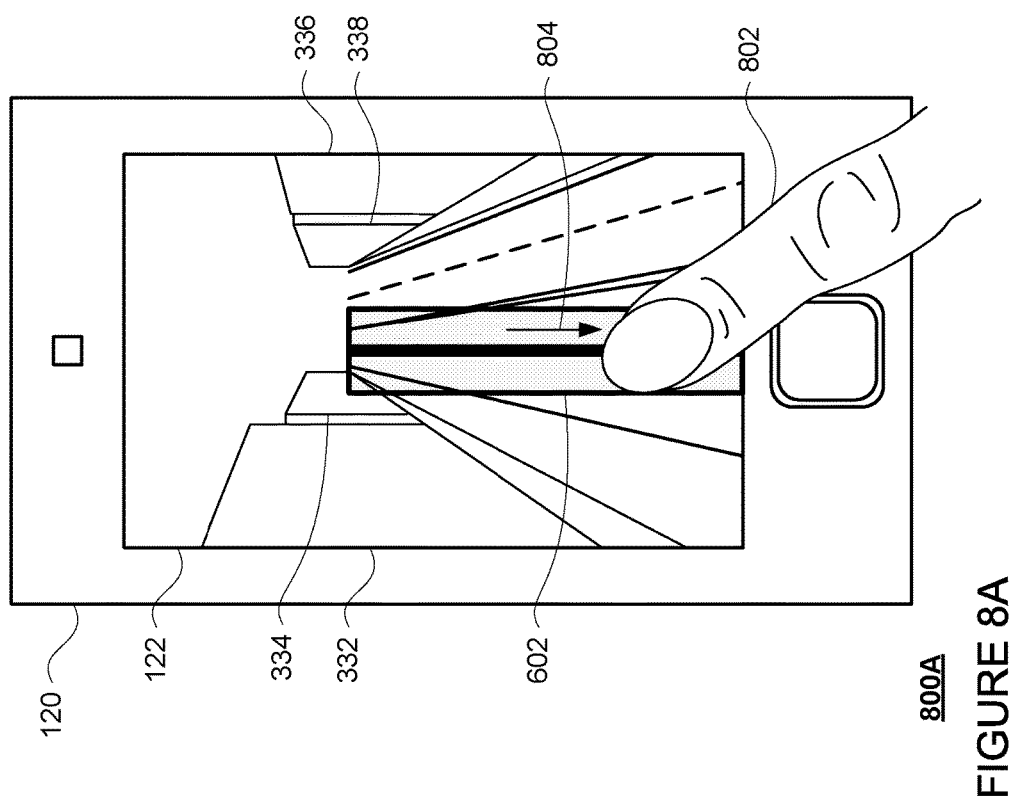
Figure 9:
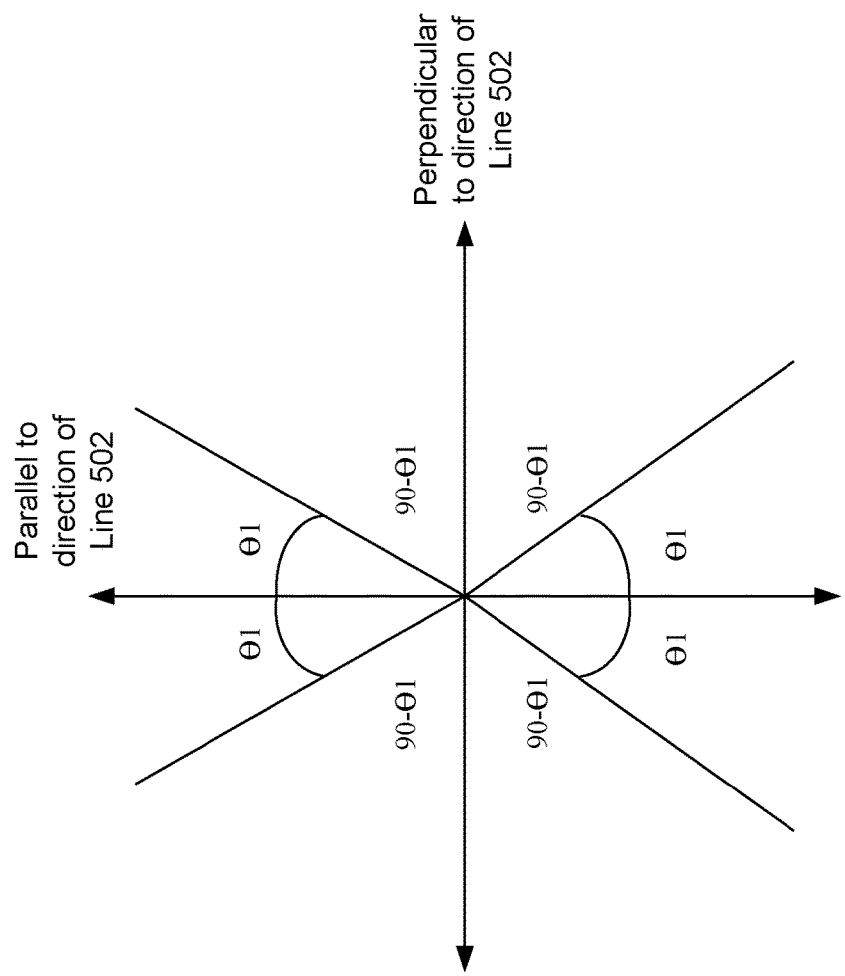
FIG. 9 is a representation of example data in accordance with aspects of the disclosure.

The characteristics of the swipe including direction, magnitude and speed can be used to define how the view will change. For instance, while a line is displayed, if the user swipes along the interaction zone, the result may be movement in a direction (within the image graphs) towards the point where the swipe began. In this regard, dragging downward as shown in FIG. 8A advances the view forward, dragging upwards as shown in FIG. 8B moves the view backward.

The magnitude of the swipe or the length in pixels can be used to determine whether how far to move the view forward or backward. For instance if the swipe does not cross a threshold minimum number of pixels the result may be no movement. If the swipe meets the threshold minimum number of pixels, the movement in the multidimensional may correspond to the number of pixels the swipe crosses. However, because the view has perspective, the relationship between the distance in pixels and the distance in the multidimensional may be exponential (as opposed to linear) as the plane on which the line appears would tilt towards the vanishing point in the image. In this regard, the distance in pixels may be converted to a distance in the multidimensional space. An image along the line according to the one or more image graphs that is closest to the distance in the multidimensional space from the original image may be identified as the image to which the view will transition.

In addition, the speed of the swipe (pixels per second), and even the acceleration of the swipe, may be used to determine how fast the view appears to move through the multidimensional. For instance, the movement may initially correspond to the speed of the swipe, but this speed may slow down and come to a stop at the image identified according to the magnitude of the swipe. In the event that the distance determined based on the magnitude of the swipe is between two images, the speed (or acceleration) of the swipe may be used to determine which image to identify as the image to which the view will transition. For instance, the farther image from the original image may be selected if the speed (or acceleration) is relatively high or greater than some threshold speed (or acceleration). At the same time, the closer image to the original image may be selected if the speed (or acceleration) is relatively low or lower than the threshold speed (or acceleration). In yet another example, where the speed (or acceleration) meets some other threshold value, in response, the view may appear to continuously move through the multidimensional space by transitioning between images along the line in the one or more image graphs according to the speed of the swipe until the user taps the display. This tap may cause the movement to slow down to a stop or immediately stop on the current or next image according to the one or more image graphs. In yet another example, the speed of a swipe made generally perpendicular to a line may be translated into a slower movement through the multidimensional than if the same speed of a swipe made generally parallel to the line. Yet further, the speed of the swipe may be determined based upon where the swipe occurs. In this regard, speed may be determined by measuring meters per pixel at a point on the screen halfway between the bottom of the screen and the horizon, following the intuition that this is the "average" screen position of the swipe. So if the user drags his or her finger exactly over this point, the pixels on the ground will move at the same speed as the user's finger.

The direction may be determined by unprojecting (converting from two dimensions to three dimensions) the current and previous screen coordinates onto the y=z plane in normalized device coordinates (NDC) and then projecting down again onto the ground plane. For instance, example 1300 of FIG. 13 is a diagram showing the relative directions (indicated by arrows 1302) of the plane of screen 1304 of computing device 120 with respect the ground plane 1306. Between these two planes is the NDC plane 1308. Example 1400 of FIG. 14 depicts the direction of a finger swipe shown by arrow 1404 on the plane of screen 1304 relative to the movement shown by arrow 1406 along the ground plane 1306. Here, the user's finger initiates the swipe at point A on the screen 1304 and ends the swipe at point B on the screen. These points are converted to the corresponding points B' and A' on the NDC plane 1308. From the NDC plane, the points are projected to points C and D on the ground plane 1306. This allows the vertical display movement to map to forward movement in the multidimensional space and horizontal display movement maps to map to lateral movement in the multidimensional space in a predictable way that is independent of scene geometry or the horizon.

As an example, when the user taps a view represented on a display of a client computing device, a line may appear. They user may then swipe along a portion of the display. Using the initial location or pixel(s) of the swipe and other locations along the swipe, the speed of the swipe may be determined. Once the swipe has completed or the user's finger leaves the display, a transition animation, such as zooming and fading into a new image, is displayed in order to transition to a new image. As an example, if the speed is small or less than a threshold, the next image along the line may be displayed as a new view. If the speed is greater than the threshold, the ending time and position on the display of the swipe are determined. The image closest to this position along the line according to the one or more image graphs is identified as a target image. In this example, the transition animation between images along the line continues until the target image is reached. In some examples, images displayed during the transition animation and the target image may be retrieved in real time from local memory or by providing the location information and requesting images from the one or more server computing devices while the transition animation is being played.

As the view will typically traverse a plurality of images in order to reach the image identified based on the characteristics of the swipe, the full resolution of these plurality of images may not actually be displayed. Instead lower resolution versions of the images, such as thumbnail images, may be displayed as part of a transition between a current image and an identified image. When the actual identified image is displayed, this image may be displayed at the full resolution. This may save time and processing power.

The characteristics of the line may be changed in order to allow the user to more easily understand navigate a multidimensional. For instance, the opacity of the line may be adjusted in order to allow the user to see more or less of the features below the line thus reducing the impact of the line on the user's ability to visually explore the multidimensional. In this regard, the width of the line may correspond to a width of a road on which the line is overlaid. Similarly, the width of the line and interaction zone may be adjusted in order to prevent the line from taking up too much of the display while at the same time making the line thick enough for the user to be able to interact with the line using his or her finger. The color of the line, for instance blue, may be selected in order to complement the current view or to allow the line to stand out from the current view.

The location of the line need not always be identical to a connection line in the one or more image graphs. For instance, where the line is displayed to correspond to the width of a road, the corresponding connections in the one or more image graphs may not actually run down the middle of the road such that the line does not perfectly correspond to the one or more image graphs. In areas where the geometry of the connection lines zig zags, the connection lines may actually be fit with a straighter line as the overlay. In this regard, the line may not pass through the center of each image but may have a smooth appearance when overlaid on the view.

In some examples, the connection graph may branch off, such as where there is an intersection of two roads, or rather, an intersection in the one or more image graphs. Example 1500A of FIG. 15 depicts an example of a branch area where two lines 1502 and 1504 cross one another. In this example, if the user swipes to go one way or the other, the resulting motion follows that desired branch according to the one or more image graphs, and the view adjusts to keep the user facing forward along the line. By showing multiple branches, the available directions of movement are immediately obvious to the user. However, in order to keep the overlay simple and easy to understand, only lines that are directly connected to a current line within a short distance of the current point of view may appear overlaid on the imagery. Using a line which points in a direction where the user is able to travel to within a predetermined distance may prevent providing the user with conflicting or confusing information about where the user can go in the multidimensional space. This is especially important in complex geometric areas, or in complex navigational sections.

In these branch areas, such as at a traffic intersection where more than one road intersect one another, a user may want to change from one line to another. Of course, traveling forward and making a 90 degree turn in the middle of an intersection can feel unnatural. In this regard, the one or more image graphs may be used to cut across the corners of an intersection between two lines by displaying images that are not on either line as a transition. FIG. 15B depicts an image graph 1500B where lines 1512 and 1514 correspond to lines 1504 and 1502, respectively. Thus, in the example of FIG. 15A, display 122 is displaying an image of image E in the direction of image G. If the user were to swipe within an interaction zone around 1502, which would correspond to the location of image H on the image graph 1500B. In this example instead of transitioning to image F, then image G, than image H, because of the branch area, the display may appear to transition from image E directly to image H along path 1516. Alternatively, only a single image may be skipped, and the display may appear to transition from image E to image F and then to image H along path 1518.

In order to further reduce the interference of the line with the user's exploration of the multidimensional, when the user is not interacting with the interface, no line may be shown. This allows the user to see the entire 3D scene. As an example, if the user taps and drags around (or clicks and drags around, or motions and drags around) anywhere in the scene, while the line is not visible, he or she will look around the scene. If the user taps on the image once, the line may appear. Effects such as a shimmer, brightening then dulling of the line, thickening then thinning of the line, or quickly making the line more or less opaque then returning to normal opacity may be used to indicate the interactive nature of the line to the user. If the user makes a dragging motion within the interaction zone, even when the line is not visible, the line may appear and the image may appear to transition along the line. After some predetermined period of time, such as 2 seconds or more or less, where there is no input received by the client computing device on the display or a half a second or more or less after a single tap on the display, the line may be faded until it disappears, again, to reduce the impact of the line on the image.

The interface may also provide for other types of navigation in addition to between images along the line corresponding to the grid. For example, as noted above, a single tap may cause the line to appear. In this example the single tap may not cause the view to change, but rather the view may appear to remain stationary. At the same time, a double tap may take a user to an image connected in the one or more image graphs to the current image at or near the point of the double tap. Further, if a user is currently facing nearly perpendicular to a line, and the user swipes generally perpendicular to the line, the view may appear to remain perpendicular to the line, allowing the user to 'strafe' along the road. In addition, a pinching gesture may zoom in or out of a particular image without actually causing a transition to a new image.

Although the examples above relate to lines, various other overlays may be used to provide the user with an indication of navigable areas in the multidimensional. For instance, a plurality of scroll bars may be placed on a map in addition to or along with a toggle switch for switching between looking around (changing orientation) and moving through the multidimensional in order to provide visual feedback to the user as he or she moves through the multidimensional. In another example, rather than a finite line, a wider line which appears to blend laterally into the view may be used. In yet another alternative, discs or short arrow-style indications which do not necessarily appear to extend far into the scene can be used to suggest the interaction zone.

Figure 16:
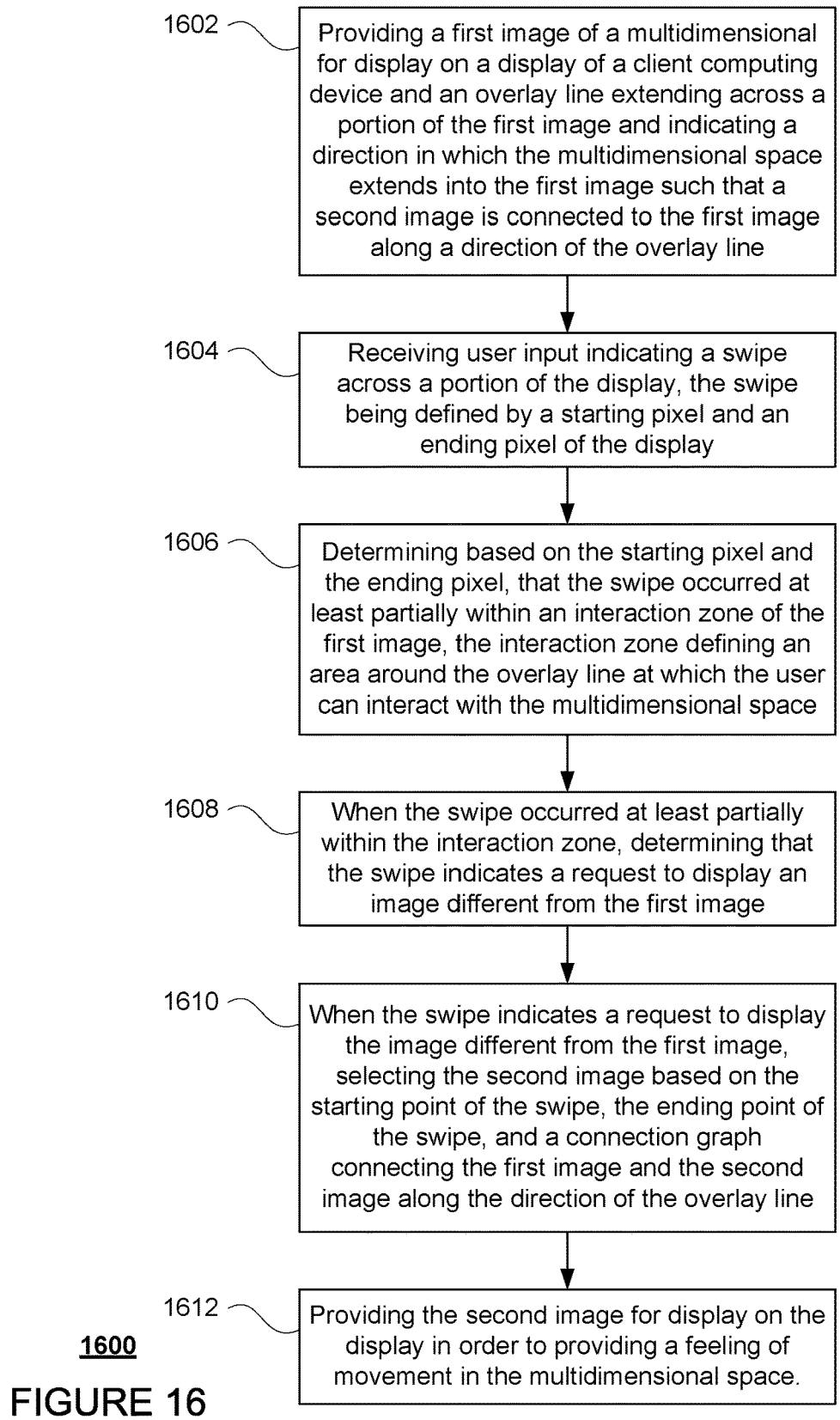
FIG. 16 is a flow diagram in accordance with aspects of the disclosure.

FIG. 16 is an example flow diagram 1600 of various of the aspects described above which may be performed by one or more server computing devices, such as server computing devices 110. In this example, a first image of a multidimensional space is provided for display on a display of a client computing device at block 1602. The first image is provided with an overlay line extending across a portion of the first image and indicating a direction in which the multidimensional space extends into the first image such that a second image is connected to the first image along a direction of the overlay line. User input indicating a swipe across a portion of the display is received at block 1604. The swipe is defined by a starting pixel and an ending pixel of the display. Based on the starting pixel and the ending pixel, it is determined that the swipe occurred at least partially within an interaction zone of the first image at block 1606. The interaction zone defines an area around the overlay line at which the user can interact with the three-dimensional space. When the swipe occurred at least partially within the interaction zone, it is determined that the swipe indicates a request to display an image different from the first image at block 1608. When the swipe indicates a request to display the image different from the first image, the second image is selected based on the starting point of the swipe, the ending point of the swipe, and a connection graph connecting the first image and the second image along the direction of the overlay line at block 1610. The second image is provided for display on the display in order to providing a feeling of movement in the multidimensional space at block 1612.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of navigating multidimensional spaces, the method comprising:
   providing, by one or more processors, a first image of a multidimensional space for display on a display of a client computing device and an overlay line extending across a portion of the first image and indicating a direction in which the multidimensional space extends into the first image such that a second image is connected to the first image along a direction of the overlay line;
   receiving, by the one or more processors, user input indicating a swipe across a portion of the display, the swipe being defined by a starting pixel and an ending pixel of the display;
   determining, by the one or more computing devices, based on the starting pixel and the ending pixel, that the swipe occurred at least partially within an interaction zone of the first image, the interaction zone defining an area around the overlay line at which the user can interact with the multidimensional space, the interaction zone encasing the area around the overlay line with the area around the overlay line expanding a width of the overlay line;
   when the swipe occurred at least partially within the interaction zone, determining, by the one or more processors, that the swipe indicates a request to display an image different from the first image;
   when the swipe indicates a request to display the image different from the first image, selecting, by the one or more computing devices, the second image based on a starting point of the swipe, an ending point of the swipe, and a connection graph connecting the first image and the second image along the direction of the overlay line; and
   providing, by the one or more computing devices, the second image for display on the display in order to provide a feeling of movement in the multidimensional space.

2. The method of claim 1, further comprising, providing a transition image for display between the first image and the second image, the transition image being provided as a thumbnail image with less detail than the first image and the second image.

3. The method of claim 1, further comprising, providing instructions to fade the overlay line out after a threshold period of time has passed without any user action with the overlay line.

4. The method of claim 3, further comprising, after fading the overlay line out:
   receiving second user input on the display; and
   providing instructions to redisplay the overlay line in response to the second user input.

5. The method of claim 1, further comprising:
   determining a direction and magnitude of the swipe based on the starting pixel of the swipe and the ending pixel of the swipe, and
   wherein selecting the second image is further based on the direction and magnitude.

6. The method of claim 1, further comprising providing the second image with a second overlay line extending across a portion of the second image and indicating a direction in which the multidimensional space extends into the second image such that a third image is connected to the second image along a direction of the second overlay line in the connection graph.

7. The method of claim 6, further comprising:
receiving second user input indicating a second swipe;
determining that the second swipe is within a threshold angle perpendicular to the direction in which the multidimensional space extends into the second image; and
when the second swipe is within a threshold angle perpendicular to the direction in which the multidimensional space extends into the second image, panning across multidimensional space of the second image.

8. The method of claim 6, further comprising:
receiving second user input indicating a second swipe;
determining that the second swipe is within a threshold angle perpendicular to the direction in which the multidimensional space extends into the second image; and
when the second swipe is within a threshold angle perpendicular to the direction in which the multidimensional space extends into the second image, changing an orientation within the second image.

9. The method of claim 6, further comprising:
receiving second user input indicating a second swipe;
determining that the second swipe is within a threshold angle perpendicular to the direction in which the multidimensional space extends into the second image; and
when the second swipe is within a threshold angle perpendicular to the direction in which the multidimensional space extends into the second image, switching from the second image to a third image located on a second connection graph adjacent to the connection graph, the second image and the third image having no direction connection in the connection graph.

10. The method of claim 9, further comprising proving for display with the second image, a third overlay line, the third overlay line representing a second navigation path proximate to a current view of the second image, the third overlay line being provided such that the third overlay line and the second overlay line cross over one another when displayed with the second image.

11. The method of claim 10, further comprising:
receiving second user input along the third overlay line indicating a request to transition from an image along the second overlay line to an image along the third overlay line; and
in response to the second user input, providing a third image for display, the third image being arranged along the third overlay line in the connection graph.

12. The method of claim 11, further comprising:
selecting a set of images for display in series as a transition between the second image and the third image based on connections between images in the connection graph; and
providing the set of images for display on the display.

13. The method of claim 12, further comprising, prior to providing the set of images, filtering the set of images to remove at least one image based on a connection between two images of the set of images in a second connection graph different from the first connection graph such that the filtered set of images are provided for display as the transition between the second image and the third image.

14. A system comprising one or more computing devices, each having one or more processors, the one or more computing devices being configured to:
provide a first image of a multidimensional space for display on a display of a client computing device and an overlay line extending across a portion of the first image and indicating a direction in which the multidimensional space extends into the first image such that a second image is connected to the first image along a direction of the overlay line;
receive user input indicating a swipe across a portion of the display, the swipe being defined by a starting pixel and an ending pixel of the display;
determine, based on the starting pixel and the ending pixel, that the swipe occurred at least partially within an interaction zone of the first image, the interaction zone defining an area around the overlay line at which the user can interact with the multidimensional space, the interaction zone encasing the area around the overlay line with the area expanding a width of the overlay line;
when the swipe occurred at least partially within the interaction zone, determine that the swipe indicates a request to display an image different from the first image;
when the swipe indicates a request to display the image different from the first image, select the second image based on a starting point of the swipe, an ending point of the swipe, and a connection graph connecting the first image and the second image along the direction of the overlay line; and
provide the second image for display on the display in order to provide a feeling of movement in the multidimensional space.

15. The system of claim 14, wherein the one or more computing devices are further configured to provide a transition image for display between the first image and the second image, the transition image being provided as a thumbnail image with less detail than the first image and the second image.

16. The system of claim 14, wherein the one or more computing devices are further configured to provide instructions to fade the overlay line out after a threshold period of time has passed without any user action with the overlay line.

17. The system of claim 16, wherein the one or more computing devices are further configured to, after fading the overlay line out:
receive second user input on the display; and
provide instructions to redisplay the overlay line in response to the second user input.

18. The system of claim 14, wherein the one or more computing devices are further configured to:
determine a direction and magnitude of the swipe based on the starting pixel of the swipe and the ending pixel of the swipe, and
to select the second image further based on the direction and magnitude.

19. The system of claim 14, wherein the one or more computing devices are further configured to provide the second image with a second overlay line extending across a portion of the second image and indicating a direction in which the multidimensional space extends into the second image such that a third image is connected to the second image along a direction of the second overlay line in the connection graph.

20. A non-transitory, computer-readable storage device on which computer readable instructions of a program are stored, the instructions, when executed by one or more processors, cause the one or more processors to perform a method, the method comprising:
providing a first image of a multidimensional space for display on a display of a client computing device and an overlay line extending across a portion of the first image and indicating a direction in which the multidimensional space extends into the first image such that a second image is connected to the first image along a direction of the overlay line;

receiving user input indicating a swipe across a portion of the display, the swipe being defined by a starting pixel and an ending pixel of the display;

determining, based on the starting pixel and the ending pixel, that the swipe occurred at least partially within an interaction zone of the first image, the interaction zone defining an area around the overlay line at which the user can interact with the multidimensional space, the interaction zone encasing the area around the overlay line with the area expanding a width of the overlay line;

when the swipe occurred at least partially within the interaction zone, determining that the swipe indicates a request to display an image different from the first image;

when the swipe indicates a request to display the image different from the first image, selecting the second image based on a starting point of the swipe, an ending point of the swipe, and a connection graph connecting the first image and the second image along the direction of the overlay line; and providing the second image for display on the display in order to provide a feeling of movement in the multidimensional space.

\* \* \* \* \*